(12) United States Patent
Park et al.

(10) Patent No.: US 9,179,028 B2
(45) Date of Patent: Nov. 3, 2015

(54) IMAGE FORMING APPARATUS TO REDUCE POWER CONSUMPTION, HOST APPARATUS, AND METHOD OF PERFORMING IMAGE FORMING JOB THEREOF

(71) Applicant: Samsung Electronics Co., Ltd, Suwon-si, Gyeonggi-do (KR)

(72) Inventors: Man-suk Park, Seoul (KR); Seung-mo Moon, Yangpyeong-gun (KR); Jong-seung Lee, Suwon-si (KR); Hyo-su Jeong, Daegu (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 13/960,020

(22) Filed: Aug. 6, 2013

(65) Prior Publication Data

US 2014/0078531 A1 Mar. 20, 2014

(30) Foreign Application Priority Data

Sep. 17, 2012 (KR) .......................... 10-2012-0102960

(51) Int. Cl.
*G06F 3/12* (2006.01)
*H04N 1/00* (2006.01)

(52) U.S. Cl.
CPC ............ *H04N 1/00896* (2013.01); *G06F 3/122* (2013.01); *G06F 3/1221* (2013.01); *G06F 3/1267* (2013.01); *G06F 3/1291* (2013.01); *H04N 1/00954* (2013.01); *H04N 2201/0082* (2013.01); *H04N 2201/0094* (2013.01); *Y02B 60/1271* (2013.01)

(58) Field of Classification Search
USPC .......................................................... 358/1.13
See application file for complete search history.

(56) References Cited

U.S. PATENT DOCUMENTS

| 8,730,506 | B2 * | 5/2014 | Kato ............................ 358/1.15 |
| 2003/0185613 | A1 | 10/2003 | Guddanti |
| 2007/0121156 | A1 | 5/2007 | Ando |
| 2007/0146775 | A1 | 6/2007 | Maeda |
| 2007/0279700 | A1 | 12/2007 | Sakata |
| 2008/0100861 | A1 * | 5/2008 | Sakura ......................... 358/1.15 |
| 2008/0158574 | A1 * | 7/2008 | Sugiyama ...................... 358/1.1 |

(Continued)

FOREIGN PATENT DOCUMENTS

| JP | 2004028428 | 1/2004 |
| JP | 2004-248227 | 9/2004 |

(Continued)

OTHER PUBLICATIONS

International Search Report and Written Opinion issued in PCT/KR2013/003834 on Aug. 27, 2013.

(Continued)

*Primary Examiner* — Benjamin O Dulaney
(74) *Attorney, Agent, or Firm* — Staas & Halsey LLP

(57) ABSTRACT

An image forming apparatus includes a memory, an interface to receive image data to perform an image forming job, and a controller to, when the image data is input in a power save mode of the image forming apparatus, send the image data to an external image forming apparatus, and when the image forming apparatus switches to a normal mode, control the image forming apparatus to perform an image forming job using the image data sent to the external image forming apparatus.

20 Claims, 24 Drawing Sheets

(56) References Cited

U.S. PATENT DOCUMENTS

| | | |
|---|---|---|
| 2009/0207423 A1* | 8/2009 | Shimizu et al. ............... 358/1.1 |
| 2009/0219569 A1* | 9/2009 | Hara ............................ 358/1.15 |
| 2009/0273803 A1* | 11/2009 | Sugimura et al. ............ 358/1.15 |
| 2009/0296163 A1 | 12/2009 | Koura |
| 2010/0007904 A1 | 1/2010 | Eto |
| 2010/0014113 A1 | 1/2010 | Iwashima |
| 2010/0033751 A1 | 2/2010 | Kitamura |
| 2010/0161819 A1* | 6/2010 | Ohara ............................ 709/229 |
| 2010/0174935 A1 | 7/2010 | Kim et al. |
| 2011/0116108 A1 | 5/2011 | Ha et al. |
| 2012/0054479 A1* | 3/2012 | Park ................................ 713/2 |
| 2012/0159212 A1* | 6/2012 | Takatani et al. ............... 713/320 |

FOREIGN PATENT DOCUMENTS

| | | |
|---|---|---|
| JP | 2006-293818 | 10/2006 |
| KR | 20070059671 | 6/2007 |
| KR | 10-2011-0053065 | 5/2011 |

OTHER PUBLICATIONS

Extended European Search Report issued in Application No. 13184715.4 on Feb. 3, 2014.

* cited by examiner

IMAGE FORMING APPARATUS TO REDUCE POWER CONSUMPTION, HOST APPARATUS, AND METHOD OF PERFORMING IMAGE FORMING JOB THEREOF

CROSS-REFERENCE TO RELATED APPLICATIONS

This application claims priority under 35 U.S.C. §119 (a) from Korean Patent Application No. 10-2012-0102960 filed on Sep. 17, 2012 in the Korean Intellectual Property Office, the entire disclosure of which is incorporated herein by reference.

BACKGROUND OF THE INVENTION

1. Field of the Invention

The present general inventive concept relates generally to an image forming apparatus, a host apparatus, and a method of performing an image forming job thereof. More particularly, the present general inventive concept relates to an image forming apparatus to reduce power consumption, a host apparatus, and a method of performing an image forming job thereof.

2. Description of the Related Art

An image forming device generates, prints, receives and sends image data. Examples of the image forming device can include a printer, a scanner, a copier, a fax machine, and a multi-functional peripheral combining functions of these devices.

Recently, attempts are being made to reduce power consumption in a normal mode where the image forming device operates normally, and in a power save mode where the image forming device conducts no particular operation.

When an image forming job command is received from a host device in the power save mode, the image forming device consumes considerable power as it switches from the power save mode to the normal mode and operates its components (for example, a printing unit or a scan unit).

In particular, even when the image forming job (such as receiving and printing a fax, for example) is requested at night, the image forming device switches from the power save mode to the normal mode for every image forming job received, which consumes a lot of power.

SUMMARY OF THE INVENTION

Features and utilities of the present general inventive concept provide an image forming apparatus to perform image forming jobs all together at a preset reservation time, without switching to a normal mode even when the image forming job is received at the image forming apparatus, and thus reducing power consumption by avoiding unnecessary normal mode switch, as well as a host apparatus, and a method to perform an image forming job.

Features and utilities of the present general inventive concept allow the unnecessary power consumption to be reduced by avoiding the image forming apparatus in the power save mode from unnecessarily changing its operation mode.

In addition, features and utilities of the present general inventive concept allow the image data to be stably stored in the power save mode without the memory shortage.

Additional features and utilities of the present general inventive concept will be set forth in part in the description which follows and, in part, will be obvious from the description, or may be learned by practice of the general inventive concept.

Exemplary embodiments of the present general inventive concept provide an image forming apparatus, a host apparatus, and a method of performing an image forming job, to address lack of memory when image data received in a power save mode is saved.

Exemplary embodiments of the present general inventive concept provide an image forming apparatus which includes a memory, an interface to receive image data to perform an image forming job, and a controller to, when the image data is input in a power save mode of the image forming apparatus, send the image data to an external image forming apparatus, and when the image forming apparatus switches to a normal mode, controlling the image forming apparatus to perform an image forming job using the image data sent to the external image forming apparatus.

The controller may control the image forming apparatus to switch to the normal mode when the image data is received from the external image forming apparatus, when a user command to enter the normal mode is input, or when a preset time arrives.

The memory may store a first reservation time to switch the image forming apparatus from the normal mode to the power save mode and a second reservation time to switch the image forming apparatus from the power save mode to the normal mode. When the first reservation time arrives in the normal mode of the image forming apparatus, the controller may control the image forming apparatus to send information on the second reservation time to the external image forming apparatus and then enter the power save mode, and when the second reservation time arrives in the power save mode of the image forming apparatus and the image data is received from the external image forming apparatus, the controller may control the image forming apparatus to enter the normal mode and perform the image forming job.

The controller may control the image forming apparatus to enter the normal mode when a user command to enter the normal mode is input in the power save mode of the image forming apparatus, and when image data is requested to the external image forming apparatus and the image data is received from the external image forming apparatus, the controller may control the image forming apparatus to perform an image forming job using the image data.

The memory may store a first reservation time to switch the image forming apparatus from the normal mode to the power save mode and a second reservation time to switch the image forming apparatus from the power save mode to the normal mode. When the second reservation time arrives in the power save mode of the image forming apparatus, the controller may control the image forming apparatus to automatically enter the normal mode, and when image data is requested to the external image forming apparatus and the image data is received from the external image forming apparatus, the controller may control the image forming apparatus to perform an image forming job using the image data.

The memory may include a first memory and a second memory, and the controller may include a main Central Processing Unit (CPU) operating in the normal mode using the first memory, and a sub CPU operating in the power save mode using the second memory.

Exemplary embodiments of the present general inventive concept provide an image forming apparatus including an interface to receive from an external image forming apparatus image data to be printed by the external image forming apparatus, a memory to store the received image data, and a controller to, when a preset time arrives or the image data is requested by the external image forming apparatus, send the stored image data to the external image forming apparatus.

The controller may receive from the external image forming apparatus information about a time to switch the external image forming apparatus from a power save mode to a normal mode, store the information in the memory, and send the stored image data to the external image forming apparatus when the time to switch the external image forming apparatus from the power save mode to the normal mode arrives.

The memory may include a first memory to operate in a normal mode, a second memory to operate in a power save mode, and a flash memory to back up the second memory in the power save mode. When the second memory lacks a space to store the image data in the power save mode, the controller may store the image data in the flash memory.

The memory may include a first memory to operate in a normal mode, and a second memory to operate in a power save mode. The controller may compress the image data to reduce a size of the image data in the power save mode and store the compressed data in the second memory.

Exemplary embodiments of the present general inventive concept provide a method of performing a job of an image forming apparatus including when a preset time arrives, entering, at the image forming apparatus, a power save mode, when image data is input to the image forming apparatus while the image forming apparatus is in the power save mode, sending the image data to an external image forming apparatus, entering, at the image forming apparatus, a normal mode, and performing, at the image forming apparatus, an image forming job using the image data sent to the external image forming apparatus.

The normal mode may be entered when the image data is received from the external image forming apparatus, a user command to enter the normal mode is input, or a preset time arrives.

Entering the power save mode may include sending a time to switch the image forming apparatus from the power save mode to the normal mode to the external image forming apparatus and entering the power save mode, and when the image data is received from the external image forming apparatus while the image forming apparatus is in the power save mode, the image forming apparatus enters the normal mode.

When a user command to enter the normal mode is input while the image forming apparatus is in the power save mode, the image forming apparatus enters the normal mode, and when image data is requested to the external image forming apparatus and the image data is received from the external image forming apparatus, the image forming apparatus may perform an image forming job using the image data.

When a time to switch from the power save mode to the normal mode arrives while the image forming apparatus is in the power save mode, the image forming apparatus may automatically enter the normal mode, and when image data is requested to the external image forming apparatus and the image data is received from the external image forming apparatus, the image forming apparatus may perform an image forming job using the image data.

Entering the power save mode may include determining whether there is a remaining image forming job when the preset time arrives, when detecting the remaining image forming job, perform the image forming job, and when the remaining image forming job is performed, entering the power save mode.

Exemplary embodiments of the present general inventive concept provide a method of performing a job of an image forming apparatus which includes receiving from an external image forming apparatus image data to be printed by the external image forming apparatus, storing the received image data in a memory, and when a preset time arrives or the image data is requested by the external image forming apparatus, sending the stored image data to the external image forming apparatus.

The method may further include receiving from the external image forming apparatus information about a time to switch the external image forming apparatus from a power save mode to a normal mode, and storing the received time information in the memory. The stored image data may be sent to the external image forming apparatus when the time to switch the external image forming apparatus from the power save mode to the normal mode arrives.

The memory may include a first memory to operate in a normal mode, a second memory to operate in a power save mode, and a flash memory to back up the second memory in the power save mode. Storing the received image data may include storing the image data in the flash memory when the second memory lacks a space to store the image data in the power save mode.

The memory may include a first memory to operate in a normal mode, and a second memory to operate in a power save mode. The storing operation may include compressing the image data to reduce a size of the image data in the power save mode, and storing the compressed data in the second memory.

Exemplary embodiments of the present general inventive concept provide a non-transitory computer-readable medium to contain computer-readable codes as a program to execute the method of performing a job of an image forming apparatus as described above, the method including when a preset time arrives, entering, at the image forming apparatus, a power save mode, when image data is input to the image forming apparatus while the image forming apparatus is in the power save mode, sending the image data to an external image forming apparatus, entering, at the image forming apparatus, a normal mode, and performing, at the image forming apparatus, an image forming job using the image data sent to the external image forming apparatus.

Exemplary embodiments of the present general inventive concept provide a non-transitory computer-readable medium to contain computer-readable codes as a program to execute the method of performing a job of an image forming apparatus as described above, the method including receiving from an external image forming apparatus image data to be printed by the external image forming apparatus, storing the received image data in a memory, and when a preset time arrives or the image data is requested by the external image forming apparatus, sending the stored image data to the external image forming apparatus.

Exemplary embodiments of the present general inventive concept provide an image forming apparatus including a print engine, and a controller to receive print data and to control the print engine to print the received print data at a predetermined time.

The predetermined time may be when a wakeup signal is received from an external image forming apparatus.

The wakeup signal may include the print data.

Exemplary embodiments of the present general inventive concept provide an image forming apparatus, including a memory, and a controller to receive print data, to store the received print data in the memory, and to perform a print job corresponding to the stored print data a predetermined time after receiving the print data.

Exemplary embodiments of the present general inventive concept provide an image forming apparatus, including a memory, and a controller to receive print data, to store the received print data in the memory, and to output the stored print data to an external image forming apparatus at a predetermined time.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
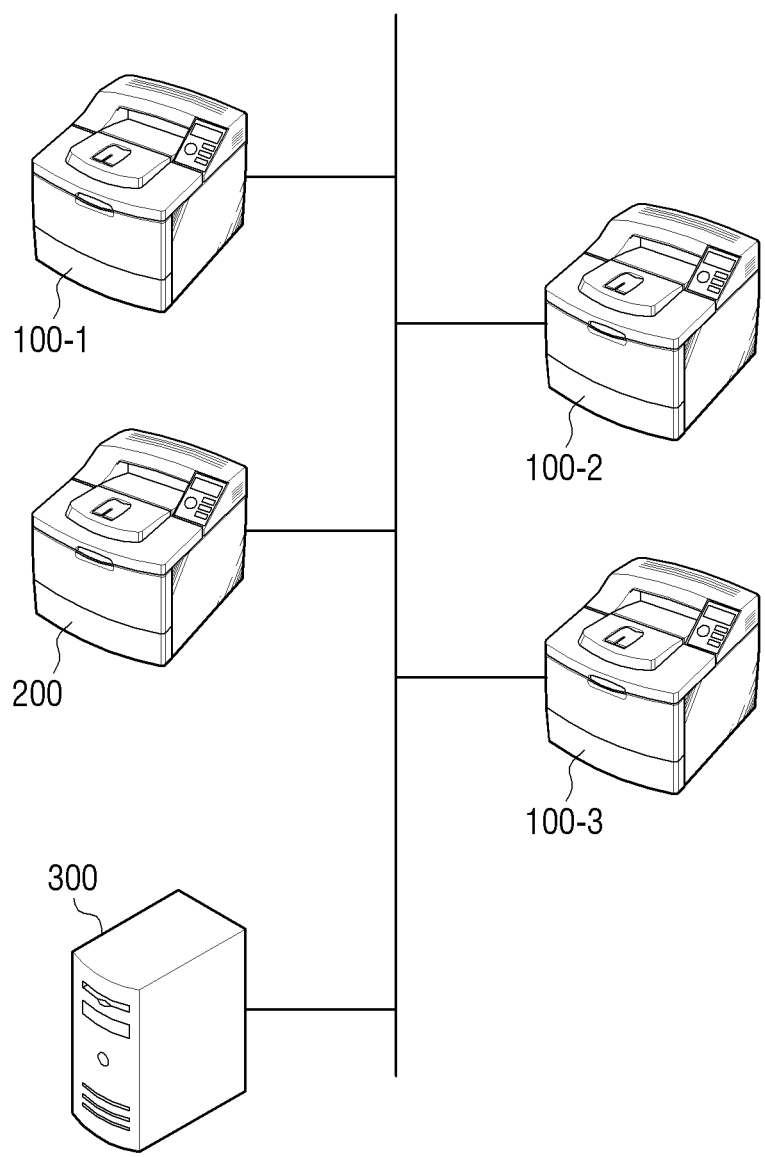
FIG. 1 is a diagram illustrating an image forming system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a diagram illustrating an image forming system 10 according to an exemplary embodiment of the present general inventive concept. Referring to FIG. 1, the image forming system 10 includes one or more sub image forming apparatuses 100 (illustrated in FIG. 1 as a plurality of sub image forming apparatuses 100-1, 100-2, and 100-3), a main image forming apparatus 200, and a host apparatus 300.

Each sub image forming apparatus 100 has two operation modes: a normal mode and a power save mode. The normal mode (also referred to as a standby mode) is a mode to perform a proper function of the sub image forming apparatus 100 when it is requested. A proper function of the sub image forming apparatus 100 may include scanning or printing a document, for example, and each proper function may be associated with a separate unit (not illustrated) of the sub image forming apparatus 100 which conducts the proper function. The power save mode operates with lower power than the normal mode by minimizing the power to a unit of the sub image forming apparatus 100, without conducting the proper function the unit is associated with. In so doing, the power save mode can be subdivided into a plurality of power save modes based on which unit of the sub image forming apparatus 100 it is applied to, the supplied power, and a standby time.

When a preset event occurs in the normal mode, the sub image forming apparatus 100 can enter the power save mode. When a preset event occurs in the power save mode, the sub image forming apparatus 100 can switch to the normal mode. The event to enter the power save mode can include a preset time passing in the standby mode, an error arising during the proper function, or the arrival of a first reservation time set by a user. The event to enter the normal mode can include receiving image data for an image forming job, or the arrival of a second reservation time set by the user.

In an exemplary embodiment of the present general inventive concept, when the sub image forming apparatus 100 enters the power save mode upon the arrival of the first reservation time set by the user and subsequently receives the image data for the image forming job from the host apparatus 300, the sub image forming apparatus 100 can send the received image data to the main image forming apparatus 200 without switching to the normal mode. The image data can be stored in the main image forming apparatus 200.

Next, when the second reservation time set by the user arrives, the sub image forming apparatus 100 switches from the power save mode to the normal mode and performs the image forming job by receiving the stored image data from the main image forming apparatus 200. Hence, between the first reservation time and the second reservation time which are set by the user, the sub image forming apparatus 100 can sustain the power save mode regardless of image data reception. For example, when the first reservation time is set to 10 o'clock at night and the second reservation time is set to 8 o'clock in the morning, the sub image forming apparatus 100 can maintain the power save mode between 10 o'clock at night and 8 o'clock in the morning in spite of image forming job requests, and carry out the requested jobs the next morning, thus reducing the power consumption.

The sub image forming apparatus 100 generates, prints, receives, and sends the image data, and can include, for example, a printer, a scanner, a copier, a fax machine, and a multi-function peripheral.

Figure 4:
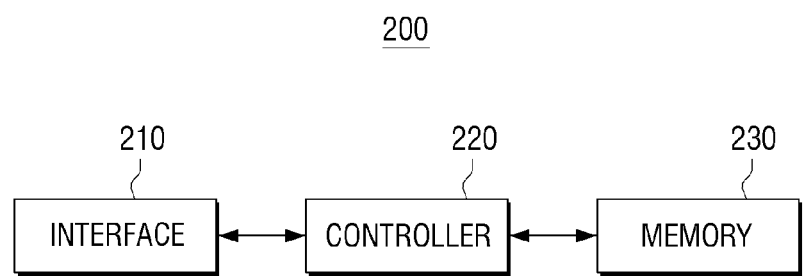
FIG. 4 is a block diagram illustrating a main image forming apparatus according to an exemplary embodiment of the present general inventive concept.
Figure 5:
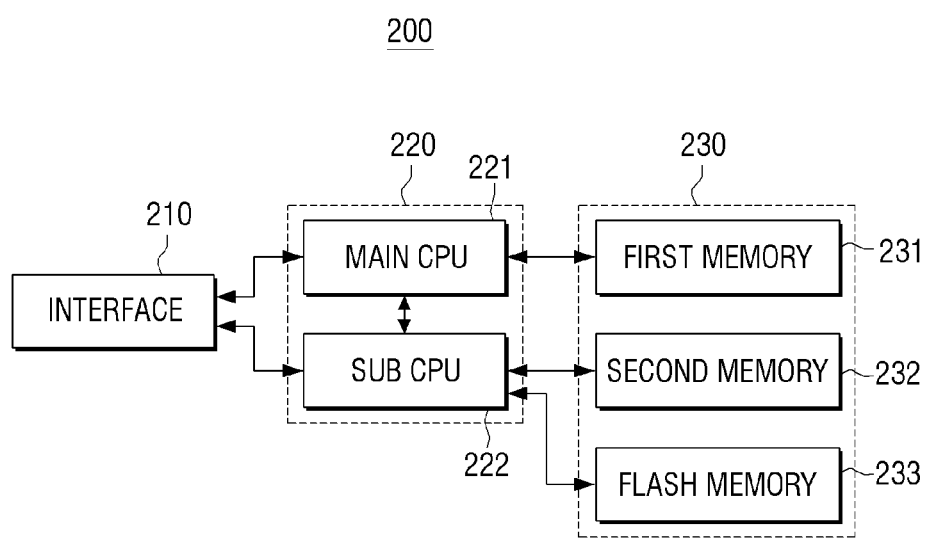
FIG. 5 is a detailed block diagram illustrating the main image forming apparatus according to an exemplary embodiment of the present general inventive concept.

The main image forming apparatus 200, when receiving the image data from the sub image forming apparatus 100, stores the received image data in a memory 230 (illustrated in FIGS. 4 and 5). When the second reservation time set by the user arrives, the main image forming apparatus 200 sends the stored image data to the sub image forming apparatus 100.

Herein, the main image forming apparatus 200 performs different operations from the sub image forming apparatus 100 to distinguish their functions. The main image forming apparatus 200 can be the same image forming apparatus as the sub image forming apparatus 100, and the user setup can determine whether to operate an image forming apparatus in the network as the main image forming apparatus 200 or as the sub image forming apparatus 100.

The main image forming apparatus 200 may be implemented using, instead of an image forming apparatus, various types of devices in the network, such as a server and a host computer (not illustrated).

The host apparatus 300 requests the image forming job according to a user command by sending the image data to either the main image forming apparatus 200 or the sub image forming apparatus 100. The host apparatus 300 can be implemented using various devices capable of requesting the image forming job from the image forming apparatus, such as a desktop computer, a tablet computer, a notebook, a smart phone, a smart TV, a fax machine, and a multi-function peripheral.

Meanwhile, the sub image forming apparatus 100, the main image forming apparatus 200, and the host apparatus 300 can be connected with each other over the network using various wire/wireless communication technologies such as LAN, WAN, WLAN, Wi-Fi, LTE, Bluetooth, Internet, and telephone network.

Hereafter, the sub image forming apparatus 100 and the main image forming apparatus 200 according to an exemplary embodiment of the present general inventive concept are explained by referring to FIGS. 2 through 5.

Figure 2:
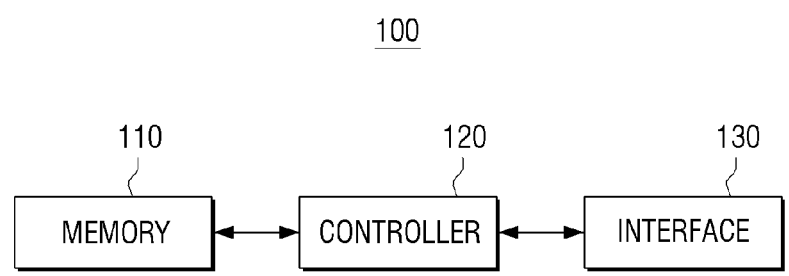
FIG. 2 is a block diagram illustrating a sub image forming apparatus according to an exemplary embodiment of the present general inventive concept.

FIG. 2 is a block diagram illustrating the sub image forming apparatus 100 according to an exemplary embodiment of the present general inventive concept. The sub image forming apparatus 100 includes a memory 110, a controller 120, and an interface 130.

The memory 110 stores an operating system and various programs to drive the sub image forming apparatus 100. In particular, the memory 110 can store the first reservation time to switch from the normal mode to the power save mode, and the second reservation time to switch from the power save mode to the normal mode.

The controller 120 controls the operations of the sub image forming apparatus 100 using the programs stored in the memory 110. In particular, the controller 120 can control the sub image forming apparatus 100 to operate in one of the normal mode and the power save mode. When a preset event arises while the sub image forming apparatus 100 is in the normal mode, the controller 120 can control the sub image forming apparatus 100 to switch to the power save mode. When a preset event arises in the power save mode of the sub image forming apparatus 100, the controller 120 can control the sub image forming apparatus 100 to switch to the normal mode. Particularly, the controller 120 can control the sub image forming apparatus 100 to switch from the normal mode to the power save mode when the first reservation time saved in the memory 110 arrives, and to switch from the power save mode to the normal mode when the second reservation time arrives.

The controller 120 can operate the sub image forming apparatus 100 in one of the normal mode and the power save mode. When the preset event occurs in the normal mode, the controller 120 can switch the sub image forming apparatus 100 to the power save mode. When the preset event occurs in the power save mode, the controller 120 can switch the sub image forming apparatus 100 to the normal mode. In particular, the controller 120 can switch the sub image forming apparatus 100 from the normal mode to the power save mode when the first reservation time saved in the memory 110 arrives, and switch the sub image forming apparatus 100 from the power save mode to the normal mode when the second reservation time arrives.

The first reservation time and the second reservation time can be set by the user. The user can input the first reservation time and the second reservation time using a computer (not illustrated) connected to the sub image forming apparatus 100, or directly to the sub image forming apparatus 100. For doing so, the sub image forming apparatus 100 can further include an input part (not illustrated) and a display (not illustrated).

Meanwhile, when the sub image forming apparatus 100 operates in the power save mode at the first reservation time and the image data is input from the host apparatus 300 through the interface 130, the controller 120 forwards the image data to the main image forming apparatus 200. That is, even when the image data is input in the power save mode of the sub image forming apparatus 100, the controller 120 can retain the sub image forming apparatus 100 in the power save mode by sending the received image data to the main image forming apparatus 200 without switching the sub image forming apparatus 100 to the normal mode.

When an event to release the power save mode occurs, the controller 120 can control the sub image forming apparatus 100 to enter the normal mode and to perform the image forming job using the image data stored in the main image forming apparatus 200. Herein, the event to release the power save mode can include the arrival of the second reservation time, a user command input to switch to the normal mode, and the image data or a wakeup signal received from the main image forming apparatus 200.

In more detail, when the second reservation time arrives in the power save mode of the sub image forming apparatus 100, the controller 120 automatically controls the sub image forming apparatus 100 to enter the normal mode. When requesting the image data from the main image forming apparatus 200 and receiving the image data, the controller 120 can control to perform the image forming job using the received image data.

When the user command to enter the normal mode is input while the sub image forming apparatus 100 operates in the power save mode, the controller 120 can control the sub image forming apparatus 100 to enter the normal mode. When requesting and receiving the image data from the main image forming apparatus 200, the controller 120 can control the sub image forming apparatus 100 to perform the image forming job using the received image data.

Alternatively, when the first reservation time arrives in the normal mode of the sub image forming apparatus 100, the controller 120 sends second reservation time information to the main image forming apparatus 200 and then enters the power save mode. When the second reservation time arrives in the power save mode and the image data or the wakeup signal is received from the main image forming apparatus 200, the controller 120 can control the sub image forming apparatus 100 to enter the normal mode and perform the image forming job.

The interface 130 communicates with the main image forming apparatus 200 and the host apparatus 300. The interface 130 can be implemented using a USB interface, a Local Area Network (LAN), an access point such as hub, and an internet. The interface 130 can be implemented using at least one module to communicate with a plurality of external devices.

In particular, the interface 130 can receive a job execution command from the external device. The interface 130 can receive job related data (e.g., the image data). While the job execution command is received separately from the image data, the job execution command can be received together with the image data at the same time and the received image data may be treated as the job execution command.

Herein, the image data can be data in a printer language such as PostScript (PS) and Pinter Control Language (PCL). When the sub image forming apparatus 100 supports direct printing, the image data may be a file such as PDF, XPS, BMP, and JPG.

The interface 130 can send the second reservation time information and the image data to the main image forming apparatus 200.

Hence, the power consumption caused by the unnecessary mode switch from the power save mode to the normal mode can be reduced.

Figure 3:
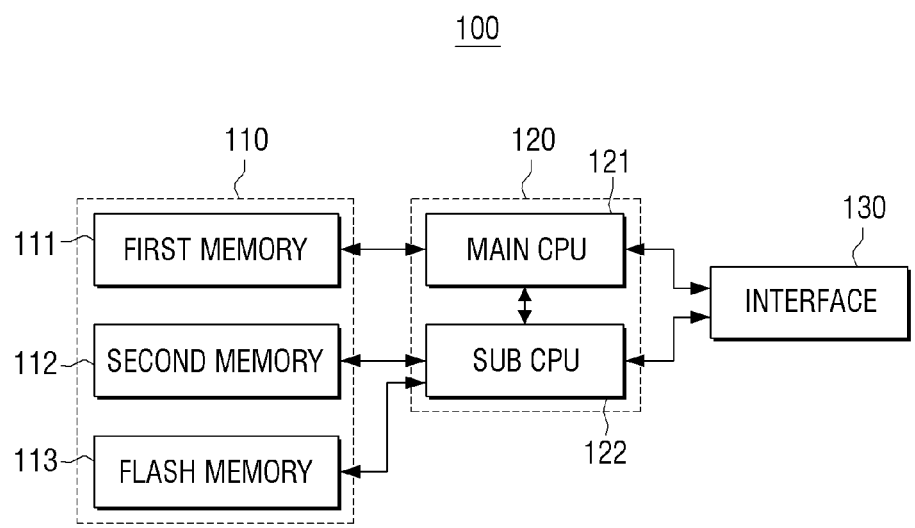
FIG. 3 is a detailed block diagram illustrating the sub image forming apparatus according to an exemplary embodiment of the present general inventive concept.

While the single memory 110 and the single controller 120 are illustrated in FIG. 2, the memory 110 can include a plurality of memories and the controller 120 can include a plurality of Central Processing Units (CPUs) in some cases, to be explained by referring to FIG. 3.

FIG. 3 is a detailed block diagram illustrating the sub image forming apparatus according to an exemplary embodiment of the present general inventive concept. Referring to FIG. 3, the memory 110 includes a first memory 111, a second memory 112, and a flash memory 113. The controller 120 includes a main CPU 121 and a sub CPU 122.

In the exemplary embodiment illustrated in FIG. 3, the first memory 111 (corresponding to a main memory or a primary memory) operates in the normal mode. The first memory 111 can be used as the main memory operating in the normal mode under control of the main CPU 121. For example, the first memory 111 can correspond to a Dynamic Random Access Memory (DRAM), and perform the proper function (such as a printing job or a scanning job) of the image forming apparatus in the normal mode or store a program or an application for the network communication. The first memory 111 can store the first reservation time to switch from the normal mode to the power save mode and the second reservation time to switch from the power save mode to the normal mode. The first memory 111 can be used to store the image data so as to process the image forming job received through the interface 130 in the normal mode.

The second memory 112 (corresponding to a sub memory or a secondary memory) operates in the power save mode. The second memory 112, which operates in the power save mode under control of the sub CPU 122, can be implemented using a Static Random Access Memory (SRAM). The second memory 112 stores a program and an application to support the power save mode, and may store the image data input in the power save mode. The second memory 112 can store the first reservation time to switch from the normal mode to the power save mode and the second reservation time to switch from the power save mode to the normal mode of the sub image forming apparatus 100.

The flash memory 113 operates in the power save mode together with the second memory 112. The flash memory 113 operates in the power save mode under the control of the sub CPU 122 and can be used as a backup memory of the second memory 112. For example, when a data size of the image data input in the power save mode is greater than the remaining storage space of the second memory 112, the image data can be stored in the flash memory 113. The flash memory 113 can be implemented using NAND and NOR memories. A NAND flash memory can employ a Compact Flash (CF), a Smart Media (SM), a Multi Media Card (MMC), a Secure Digital (SD), a Memory Stick (MS), and so on. The flash memory 113 can include an additional storage buffer to store Error Correction Code (ECC) bits.

The main CPU 121 (corresponding to a first CPU or a primary CPU) controls the operations of the sub image forming apparatus 100 in the normal mode. In detail, the main CPU 121 can control the first memory 111 and the interface 130 to operate in the normal mode. When an image forming job is requested in the normal mode, the main CPU 121 can perform the image forming job by controlling the corresponding function block (for example, a printing part or a scanning part).

When a preset event arises in the normal mode, the main CPU 121 can be deactivated to switch the sub image forming apparatus 100 to the power save mode. In particular, when the first reservation time stored in the first memory 111 arrives, the main CPU 121 is deactivated to switch the sub image forming apparatus 100 from the normal mode to the power save mode. Herein, the deactivation means that the power supplied to the main CPU 121 is cut off or reduced.

When the sub image forming apparatus 100 switches from the normal mode to the power save mode, the main CPU 121 can be deactivated after storing a necessary program or application, and the image data for the power save mode among the programs or the applications saved in the first memory 111, to the second memory 112.

To reduce the power consumption, the second memory 112 can operate with lower power than the first memory 111 or utilize a memory of reduced storage space. As a result of this, when the main CPU 121 backs up the data stored in the first memory 111 to the second memory 112 in order to switch the sub image forming apparatus 100 from the normal mode to the power save mode, the storage space of the second memory 112 may be insufficient. In particular, when the first memory 111 stores the image data for reserved printing, the second memory 112 can lack the storage space for massive image data.

Hence, to back up the data stored in the first memory 111 to the second memory 112, the main CPU 121 can determine whether the first memory 111 contains image data. Upon detecting the image data, the main CPU 121 checks the data size of the image data to be backed up. When the storage space of the second memory 112 is sufficient, the main CPU 121 can store the image data in the second memory 112. By contrast, when the storage space of the second memory 112 is insufficient, the main CPU 121 can compress and store the image data in the second memory 112, or store the image data in the flash memory 113.

When the first reservation time arrives in the normal mode, the main CPU 121 can send the second reservation time information to the main image forming apparatus 200 and then be deactivated so that the sub image forming apparatus 100 enters the power save mode.

The sub CPU 122 controls the operations of the sub image forming apparatus 100 in the power save mode. In detail, the sub CPU 122 can control the second memory 112, the flash memory 113, and the interface 130 to operate in the power save mode.

When the first reservation time arrives and the image data is input from the host apparatus 300 through the interface 130 in the power save mode, the sub CPU 122 (corresponding to a second CPU or an auxiliary CPU) can forward the image data to the main image forming apparatus 200. That is, even when the image data is input in the power save mode, the sub CPU 122 can send the received image data to the main image forming apparatus 200 and maintain the sub image forming apparatus 100 in power save mode without switching to the normal mode.

Meanwhile, when the image data is input from the host apparatus 300 through the interface 130 in the power save mode, the sub CPU 122 may store the input image data in the second memory 112. Herein, the sub CPU 122 can check the data size of the input image data. When the storage space of the second memory 112 is insufficient, the sub CPU 122 can compress and store the image data in the second memory 112, or store the image data in the flash memory 113. As part of storing the image data in the flash memory 113, the sub CPU 122 can generate the ECC bits and store them together with the image data in the flash memory 113. In detail, the sub CPU 122 can correct a possible read/write error by storing the ECC bits in the additional storage buffer of the flash memory 113.

When the event to release the power save mode occurs, the sub CPU 122 activates the main CPU 121 so that the sub image forming apparatus 100 enters the normal mode. The event to release the power save mode can include the arrival of the second reservation time, a user command input to switch to the normal mode, and the image data or a wakeup signal received from the main image forming apparatus 200.

In more detail, when the second reservation time arrives in the power save mode, the sub CPU 122 can control the sub image forming apparatus 100 to enter the normal mode by automatically activating the main CPU 121. When requesting the image data from the main image forming apparatus 200 and receiving the image data, the main CPU 121 can perform the image forming job using the received image data.

When the user command to enter the normal mode is input in the power save mode, the sub CPU 122 can control the sub image forming apparatus 100 to enter the normal mode by activating the main CPU 121. When requesting and receiving the image data from the main image forming apparatus 200, the main CPU 121 can perform the image forming job using the received image data.

Alternatively, when the second reservation time arrives in the power save mode and the image data or the wakeup signal is received from the main image forming apparatus 200, the sub CPU 122 can control the sub image forming apparatus 100 to enter the normal mode by activating the main CPU 121.

The power save mode of the sub image forming apparatus 100 can include a plurality of power save modes. For example, the sub image forming apparatus 100 can include four power save modes as follows.

[First Power Save Mode]

When receiving no signal through the interface 130 requesting a job during a first preset time in the normal mode, the sub image forming apparatus 100 can switch from the normal mode to a first power save mode.

In this exemplary embodiment of the present general inventive concept, the first power save mode lowers an operating frequency of the first memory 111 to a minimum operating frequency and lowers an operating frequency of the main CPU 121 of the controller 120 to a first operating frequency. For example, when the operating frequency of the first memory 111 is 300 MHz, the minimum operating frequency of the first memory 111 can be 133 MHz. Furthermore, when the maximum operating frequency of the main CPU 121 is 600 MHz, the first operating frequency of the main CPU 121 can be 133 MHz.

[Second Power Save Mode]

When no external signal (for example, the job command and the image data received from the host apparatus 300) instructing to switch to the normal mode is received for a second preset time while in the first power save mode, the sub image forming apparatus 100 can switch from the first power save mode to a second power save mode.

In this exemplary embodiment of the present general inventive concept, the second power save mode operates the main CPU 121 using information copied to an internal memory (such as the second memory 112), and switches the first memory 111 from the normal mode to a self-refresh mode.

In this case, the first memory 111, when no external signal instructing to switch from the second power save mode to the normal mode is received at the interface 130, can retain the self-refresh mode in spite of other external signals received.

[Third Power Save Mode]

When no external signal instructing to switch to the normal mode is received during a third preset time while in the second power save mode, the sub image forming apparatus 100 switches from the second power save mode to a third power save mode.

In this exemplary embodiment of the present general inventive concept, the third power save mode deactivates the main CPU 121 by lowering the operating frequency of the main CPU 121 to the minimum operating frequency or cutting off the power supplied to the main CPU 121 entirely. For example, when a first operating frequency of the CPU is 133 MHz, the minimum operating frequency of the main CPU 121 can be 33 MHz. Furthermore, the third power save mode supplies power to the sub CPU 122, which consumes less power than the main CPU 121, and cuts off the power supplied to the function blocks and the operation modules (not illustrated) of the sub image forming apparatus 100 which perform the proper function of the image forming job. Hence, the power consumption can be further reduced than the second power save mode.

The operating frequency of the interface 130 can also be changed in the third power save mode. For example, the operating frequency of the interface 130 may be changed from 133 MHz to 33 MHz.

[Fourth Power Save Mode]

When no external signal instructing to switch to the normal mode is received during a fourth preset time while in the third power save mode, the sub image forming apparatus 100 switches from the third power save mode to a fourth power save mode.

In this exemplary embodiment of the present general inventive concept, the fourth power save mode turns off the first memory 111 by cutting off the power supplied to it. Since the first memory 111 is turned off, the power consumption can be reduced further than the third power save mode.

The above-stated operating frequencies and the power values are merely exemplary, and can vary according to characteristics and number of the components and characteristics of the sub image forming apparatus 100. That is, the operating frequency and the power are not limited to those values recited for this exemplary embodiment of the present general inventive concept.

Exemplary embodiments of the image forming apparatus according to the present general inventive concept may include, but are limited to, the four power save modes. The present general inventive concept can be applied to a plurality of power save modes. The characteristics, number, operating frequency, and power value of the components in the plurality of the power save modes may be varied as necessary for a particular embodiment of the present general inventive concept.

More specifically, when the first reservation time arrives and the sub image forming apparatus 100 is switched from the normal mode to the power save mode, the sub image forming apparatus 100 can enter any one of a plurality of power save modes specific to the individual sub image forming apparatus 100. The user can select which one of the plurality of power save modes to enter.

FIG. 4 is a block diagram illustrating the main image forming apparatus 200 according to an exemplary embodiment of the present general inventive concept. Referring to FIG. 4, the main image forming apparatus 200 includes an interface 210, a controller 220, and a memory 230.

The interface 210 communicates with the sub image forming apparatus 100 and the host apparatus 300. The interface 210 can be implemented using a USB interface, a LAN, an access point such as hub, and an internet. The interface 210 can be implemented using at least one module to communicate with a plurality of external devices.

In particular, the interface 210 can receive the image data to be printed by the sub image forming apparatus 100, from the sub image forming apparatus 100, and send the wakeup signal and the image data to the sub image forming apparatus 100. The interface 210 may receive the image data directly from the host apparatus 300.

The memory 230 stores an operating system and various programs to drive the main image forming apparatus 200. In particular, the memory 230 can store the image data to be processed by the sub image forming apparatus 100. When the second reservation time information is received from the sub image forming apparatus 100, the memory 230 can store the second reservation time information.

The controller 220 controls the operations of the main image forming apparatus 200 using the program stored in the memory 230. In particular, the controller 220 stores the image data received through the interface 210 in the memory 230. When the event to release the power save mode of the sub image forming apparatus 100 takes place, the controller 220 can send the image data stored in the memory 230 to the sub image forming apparatus 100 through the interface 210.

In more detail, the controller 220 can receive from the sub image forming apparatus 100, the second reservation time information to switch the sub image forming apparatus 100 from the power save mode to the normal mode, and store the information in the memory 230. When the second reservation time arrives, the controller 220 can control the interface 210 to send the image data stored in the memory 230 to the sub image forming apparatus 100.

Alternatively, when receiving an image data request from the sub image forming apparatus 100, the controller 220 can control the interface 210 to send the image data stored in the memory 230 to the sub image forming apparatus 100.

Meanwhile, the controller 220 can control the main image forming apparatus 200 to operate in the normal mode and the power save mode similarly to the controller 120 of the sub image forming apparatus 100.

Hence, the power consumption caused by the unnecessary mode switch from the power save mode to the normal mode can be reduced.

While the single controller 220 and the single memory 230 are illustrated in FIG. 4, the controller 220 can include a plurality of CPUs and the memory 230 can include a plurality of memories in some cases, to be explained by referring to FIG. 5.

FIG. 5 is a detailed block diagram illustrating the main image forming apparatus according to an exemplary embodiment of the present general inventive concept. Referring to FIG. 5, the controller 220 of the main image forming apparatus 200 includes a main CPU 221 and a sub CPU 222. The memory 230 includes a first memory 231, a second memory 232, and a flash memory 233.

The main CPU (corresponding to a first CPU or a primary CPU) 221 controls the operations of the main image forming apparatus 200 in the normal mode. In detail, the main CPU 221 can control the first memory 231 and the interface 210 to operate in the normal mode. When the image forming job is requested to the main image forming apparatus 200 in the normal mode, the main CPU 221 can perform the image forming job by controlling the corresponding function block (e.g., the printing part or the scanning part).

When receiving the image data from the sub image forming apparatus 100 in the normal mode, the main CPU 221 stores the received image data in the first memory 231. When receiving the second reservation time information to switch the sub image forming apparatus 100 from the power save mode to the normal mode, from the sub image forming apparatus 100 in the normal mode, the main CPU 221 stores the received second reservation time information in the first memory 231. When the second reservation time arrives, the main CPU 221 can send the image data stored in the first memory 231 to the sub image forming apparatus 100. When receiving an image data request signal from the sub image forming apparatus 100 in the normal mode, the main CPU 221 may send the image data stored in the first memory 231 to the sub image forming apparatus 100.

When the main image forming apparatus 200 changes from the normal mode to the power save mode, the main CPU 221 can be deactivated after storing a necessary program or application for the power save mode, among the programs or the applications stored in the first memory 231, to the second memory 232. The main CPU 221 can back up the second reservation time information and the image data stored in the first memory 231, to the second memory 232.

Herein, to back up the data stored in the first memory 231 to the second memory 232, the main CPU 221 can determine whether the first memory 231 contains the image data. Upon detecting the image data, the main CPU 221 checks the data size of the image data to back up. When the storage space of the second memory 232 is sufficient, the main CPU 221 can store the image data in the second memory 232. By contrast, when the storage space of the second memory 232 is insufficient, the main CPU 221 can compress and store the image data in the second memory 232, or store the image data in the flash memory 233.

The sub CPU 222 (which may be for example a second CPU or an auxiliary CPU) controls the operations of the main image forming apparatus 200 in the power save mode. In detail, the sub CPU 222 can control the second memory 232, the flash memory 233, and the interface 210 to operate in the power save mode.

When receiving the image data from the sub image forming apparatus 100 in the power save mode, the sub CPU 222 stores the received image data in the second memory 232. When receiving the second reservation time information from the sub image forming apparatus 100 in the power save mode to switch the sub image forming apparatus 100 from the power save mode to the normal mode the sub CPU 222 stores the received second reservation time information in the second memory 232. At the second reservation time, the sub CPU 222 can send the image data stored in the second memory 232 to the sub image forming apparatus 100 through the interface 210. When receiving an image data request signal from the sub image forming apparatus 100 in the power save mode, the sub CPU 222 may send the image data stored in the second memory 232 to the sub image forming apparatus 100 through the interface 210.

Herein, the sub CPU 222 can check the data size of the input image data. When the storage space of the second memory 232 is insufficient, the sub CPU 222 can compress and store the image data in the second memory 232, or store the input image data in the flash memory 233. While storing the image data in the flash memory 233, the sub CPU 222 can generate and store the ECC bits together with the image data in the flash memory 233. In detail, the sub CPU 222 can correct a possible read/write error by storing the ECC bits in the additional storage buffer of the flash memory 233.

When the main image forming apparatus 200 changes from the power save mode to the normal mode, the sub CPU 222 can back up the second reservation time information and the image data stored in the second memory 232, to the first memory 231.

The first memory 231 (corresponding to a main memory or a primary memory) operates when the main image forming apparatus 200 is in the normal mode. The first memory 231 can be used as the main memory operating in the normal mode under the control of the main CPU 221. For example, the first memory 231 can correspond to a DRAM, and perform the proper function (the printing job or the scanning job) of the image forming apparatus in the normal mode or store a program or an application for the network communication. The first memory 231 can be used to store the image data received from the sub image forming apparatus 100 through the interface 210 in the normal mode.

The second memory 232 (corresponding to a sub memory or a secondary memory) operates when the main image forming apparatus 200 is in the power save mode. The second memory 232, which operates in the power save mode under control of the sub CPU 222, can be implemented using a SRAM. The second memory 232 stores a program and an application to support the power save mode, and may store the image data input in the power save mode.

The flash memory 233 operates in the power save mode together with the second memory 232. The flash memory 233 operates in the power save mode under the control of the sub CPU 222 and can be used as a backup memory of the second memory 232. For example, when the data size of the image data input in the power save mode is greater than the remaining storage space of the second memory 232, the image data can be stored in the flash memory 233. The flash memory 233 can be implemented using NAND and NOR memories. The NAND flash memory can employ a CF, a SM, a MMC, a SD, a MS, and so on. The flash memory 233 can include an additional storage buffer to store the ECC bits.

Similar to the sub image forming apparatus 100, the main image forming apparatus 200 can include a plurality of power save modes.

In this exemplary embodiment, the main CPUs 121 and 221 of the sub image forming apparatus 100 and the main image forming apparatus 200 respectively control the first memories 111 and 231 in the normal mode, and the sub CPUs 122 and 222 respectively control the second memories 112 and 232 and the flash memories 113 and 233 in the power save mode, by way of example. The main CPUs 121 and 221 may respectively control not only the first memories 111 and 231 but also the second memories 112 and 232 and the flash memories 113 and 233 in the normal mode, and the sub CPUs 122 and 222 may respectively control the first memories 111 and 231 in the power save mode. While the sub CPUs 122 and 222 are deactivated in the normal mode, the sub CPUs 122 and 222 may activate in the normal mode to aid the respective main CPUs 121 and 221. That is, the operations in the normal mode and the power save mode of the image forming apparatuses 100 and 200 are not limited to the above-stated exemplary embodiments and can vary.

Figure 6:
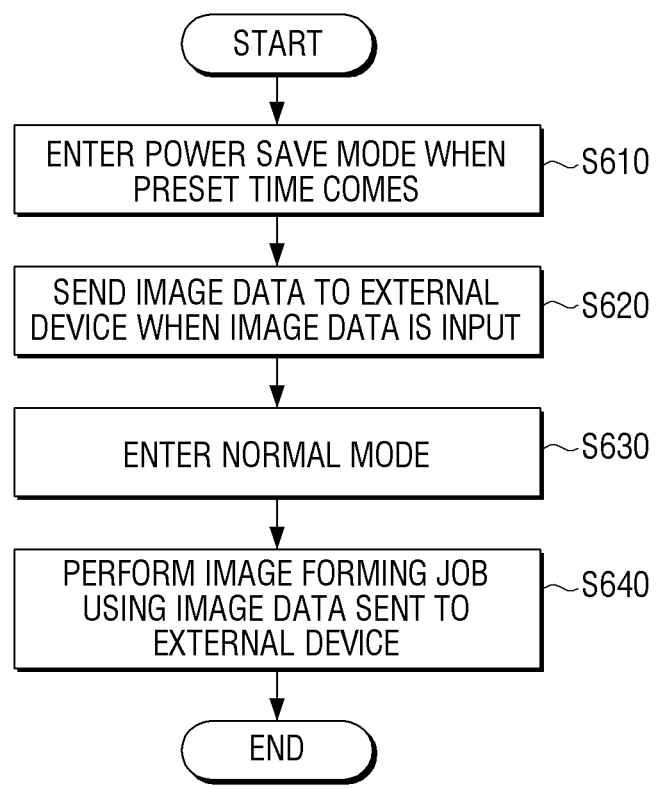
FIG. 6 is a flowchart illustrating a job execution method of the sub image forming apparatus according to an exemplary embodiment of the present general inventive concept.

FIG. 6 is a flowchart illustrating a job execution method of the sub image forming apparatus 100 according to an exemplary embodiment of the present general inventive concept.

Referring to FIG. 6, when a preset time arrives, the sub image forming apparatus 100 enters the power save mode (operation S610). Herein, the preset time can be the first reservation time. As part of entering the power save mode, the sub image forming apparatus 100 can determine whether any image forming job remains at the first reservation time, perform the remaining image forming job if any, and enter the power save mode when every image forming job is conducted.

When the image data is input in the power save mode, the sub image forming apparatus 100 forwards the image data to an external device (operation S620). In this exemplary embodiment of the present general inventive concept, the external device may correspond to the main image forming apparatus 200, an image forming apparatus other than the main image forming apparatus 200, or a server.

Next, the sub image forming apparatus 100 enters the normal mode (operation S630). In this exemplary embodiment of the present general inventive concept, the sub image forming apparatus 100 can enter the normal mode when the second reservation time arrives, when the user command to switch to the normal mode is input, or when the image data is received from the external device.

Using the image data forwarded to the external device, the sub image forming apparatus 100 performs the image forming job (operation S640).

Figure 7:
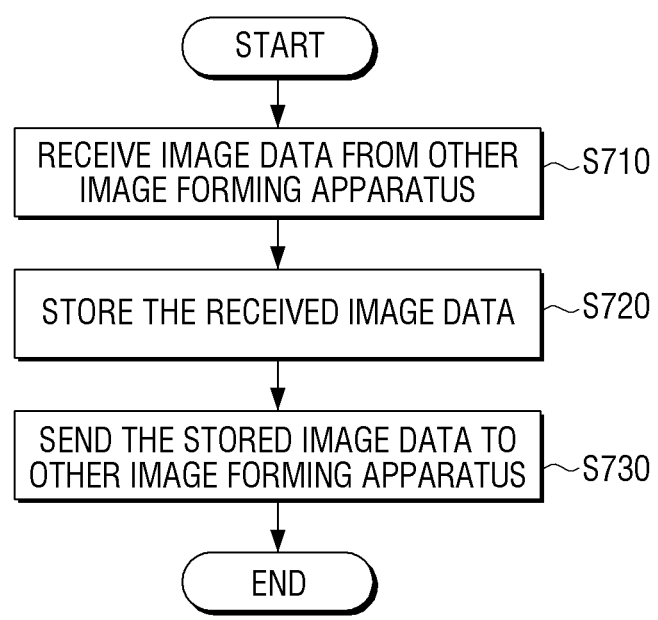
FIG. 7 is a flowchart illustrating a job execution method of the main image forming apparatus according to an exemplary embodiment of the present general inventive concept.

FIG. 7 is a flowchart illustrating a job execution method of the main image forming apparatus 200 according to an exemplary embodiment of the present general inventive concept. The exemplary embodiment is described herein with reference to FIGS. 5 and 7.

The main image forming apparatus 200 (which may correspond to the server) receives the image data to be printed by the sub image forming apparatus 100, from another image forming apparatus (corresponding to the sub image forming apparatus 100) (operation S710).

The main image forming apparatus 200 stores the received image data in the memory 230 (operation S720). Herein, the memory 230 can include the first memory 231 operating in the normal mode, the second memory 232 operating in the power save mode, and the flash memory 233 to back up the second memory 232 in the power save mode. In operation S720, the main image forming apparatus 200 can store the image data in the first memory 231 in the normal mode, and store the image data in the second memory 232 in the power save mode. When the second memory 232 lacks the storage space to store the image data in the power save mode, the main image forming apparatus 200 can store the image data in the flash memory 233. When the second memory 232 lacks the storage space to store the image data in the power save mode, the main image forming apparatus 200 can compress the image data to reduce the image data size and store the compressed data in the second memory 232.

Next, when a preset time arrives or the image data request is received from the other image forming apparatus (which may be the sub image forming apparatus 100), the main image forming apparatus 200 sends the stored image data to the other image forming apparatus (operation S730). Herein, the preset time can be the second reservation time to switch the sub image forming apparatus 100 from the power save mode to the normal mode.

Meanwhile, the method can further include an operation to receive the second reservation time information to switch the sub image forming apparatus 100 from the power save mode to the normal mode, from the sub image forming apparatus 100, and storing the received second reservation time information. In operation S730, when the second reservation time to switch the sub image forming apparatus 100 from the power save mode to the normal mode arrives, the main image forming apparatus 200 can send the stored image data to the sub image forming apparatus 100.

The image forming system can include the plurality of the sub and main image forming apparatuses 100-1, 100-2, 100-3, and 200 illustrated in FIG. 1. The image forming apparatuses 100-1, 100-2, 100-3, and 200 may be identical, whereas their operation can differ according to whether they are configured to operate as the sub image forming apparatus 100 or the main image forming apparatus 200. The main image forming apparatus 200 of the image forming system 10 can be designated by the user. In detail, the user can set the main image forming apparatus 200 using the host apparatus 300 such as a server to manage the image forming system 10 or a computer connected to the image forming system 10, or using direct manipulation of the main image forming apparatus 200. A method of setting the main image forming apparatus 200 using a server or a computer is illustrated in FIGS. 8 and 9.

Figure 8:
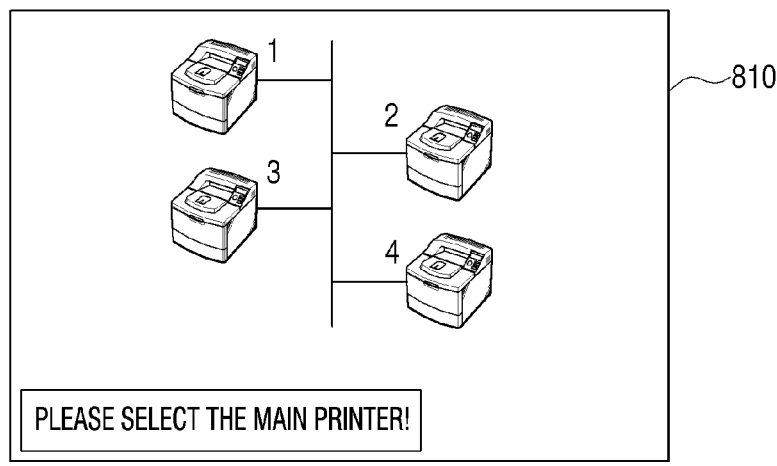
FIGS. 8 and 9 are diagrams illustrating designation of the main image forming apparatus according to an exemplary embodiment of the present general inventive concept.
Figure 9:
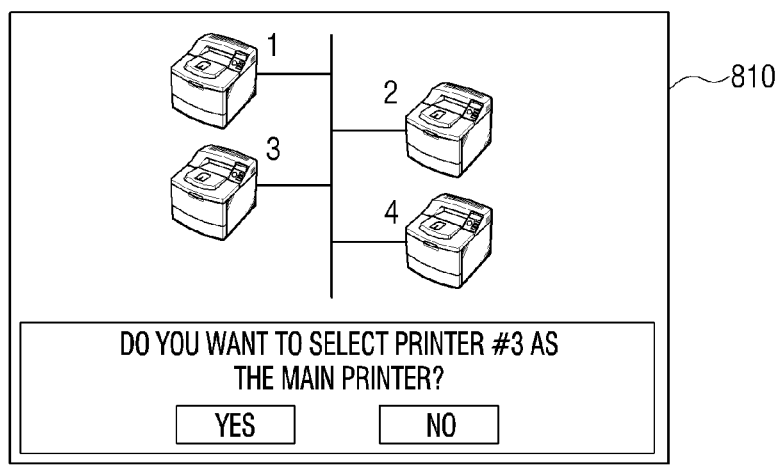

FIGS. 8 and 9 are diagrams illustrating the designation of the main image forming apparatus according to an exemplary embodiment of the present general inventive concept. Referring to FIG. 8, a display of the server or the computer can provide a display screen 810 showing the multiple image forming apparatuses of the image forming system 10. To easily distinguish the image forming apparatuses in the display screen 810, identification numbers such as 1, 2, 3 and 4 can be given to the image forming apparatuses as illustrated in FIGS. 8 and 9. Alternatively, a model name, a serial number, an IP address, or a Media Access Control address (MAC address) of each image forming apparatus can be provided. A text or an object, such as "Please select the main printer!", as illustrated in FIG. 8, to guide the user manipulation can be provided.

When the user selects the image forming apparatus for the main image forming apparatus 200 through the display screen 810, the selected image forming apparatus can be set to the main image forming apparatus 200. Meanwhile, when the user selects a particular image forming apparatus, a message for confirming the selection may be output. For example, when the user selects the image forming apparatus #3 of FIG. 8, a confirmation message such as "Do you want to select printer #3 as the main printer?" of FIG. 9 may be output.

Meanwhile, the image forming apparatus selected as the main image forming apparatus 200 by the user can be displayed differently from the other image forming apparatuses. For example, the image of the main image forming apparatus 200 can be highlighted, or an object indicating the main image forming apparatus 200 can be displayed around the image of the main image forming apparatus 200.

The user can set, change, and delete the main image forming apparatus 200 through the process illustrated in FIGS. 8 and 9.

Figure 10:
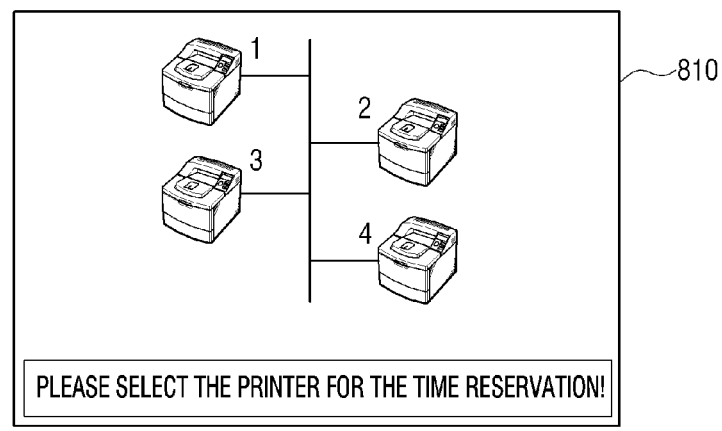
FIGS. 10, 11 and 12 are diagrams illustrating reservation time and day setting of the sub image forming apparatus according to an exemplary embodiment of the present general inventive concept.
Figure 11:
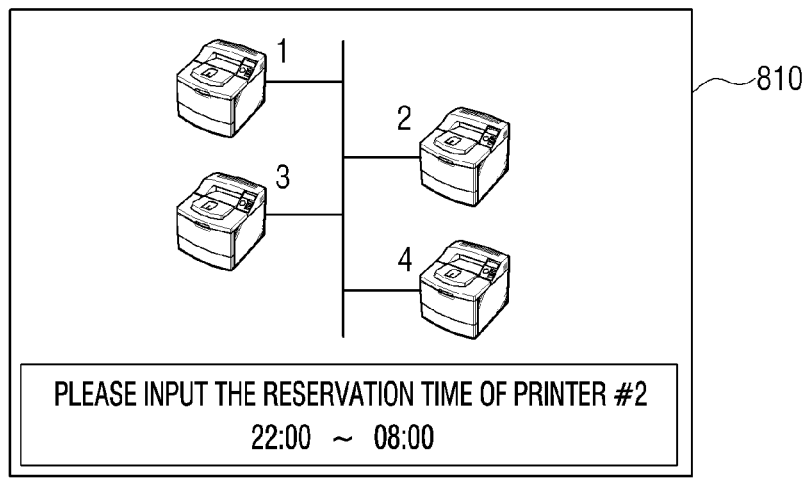
Figure 12:
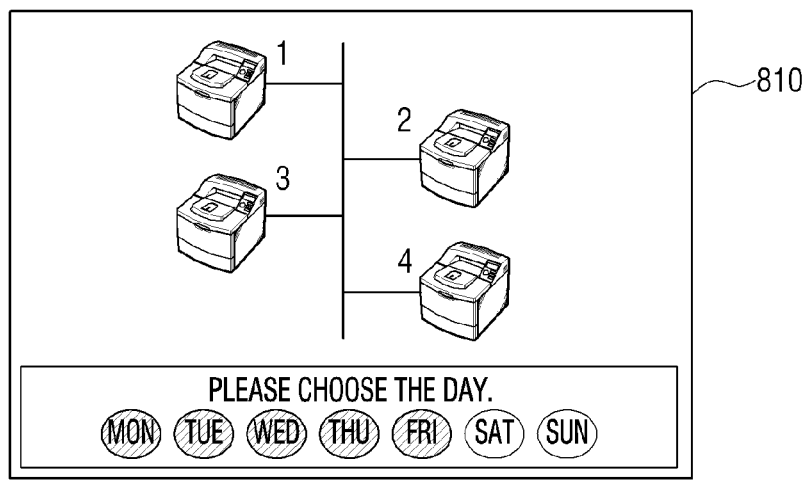

FIGS. 10, 11 and 12 are diagrams illustrating reservation time and day setting of the sub image forming apparatus 100 according to an exemplary embodiment of the present general inventive concept.

Referring to FIG. 10, the display screen showing the multiple image forming apparatuses of the image forming system 10 can be provided through the display of the server or the computer. To easily distinguish the image forming apparatuses in the display screen 810, identification numbers such as 1, 2, 3 and 4 can be given to the image forming apparatuses as illustrated in FIG. 10. Alternatively, the model name, the serial number, the IP address, or the MAC address of each image forming apparatus can be provided. A text or an object, such as "Please select the printer for the time reservation!", as illustrated in FIG. 10, to guide the user manipulation can be provided.

When the user selects the image forming apparatus to set the reservation time through the display screen, a screen to set the reservation time of the selected image forming apparatus can be provided. For example, when the user selects the printer #2, a message such as "Please input the reservation time of printer #2. 00:00~00:00" can be output. The user can input the reservation time of the selected printer through an input device such as touch pad or keyboard (not illustrated). When the user inputs for example the reservation time 22:00~08:00 as illustrated in FIG. 11, the first reservation time can be set to 22:00 and the second reservation time can be set to 08:00. Hence, the selected printer can operate in the power save mode between 22:00 and 08:00.

The user may also alter the reservation time per day. For doing so, the reservation time may be input by designating the day as illustrated in FIG. 12. That is, the printer can for example operate in the power save mode only during the night on weekdays from Monday to Friday, and even in the daytime on Saturday and Sunday. Specific days, such as holidays, can also be designated in this manner.

The user may set the reservation time of the sub image forming apparatus 100 using not only the server or the computer but also direct manipulation of the sub image forming apparatus 100.

In this exemplary embodiment, the sub image forming apparatus 100 changes from the normal mode to the power save mode at the first reservation time and switches from the power save mode to the normal mode at the second reservation time. When the user command to change the operation mode is input, the operation mode of the sub image forming apparatus 100 can be changed even though it is not the first reservation time or the second reservation time. For example, although the reservation time of the image forming apparatus used in the office is set to 22:00~08:00, when all of workers get off before the first reservation time 22:00 or when the worker goes to the office before the second reservation time 08:00, it is preferable that the user can arbitrarily control the sub image forming apparatus 100 to enter the power save mode or the normal mode.

Figure 13:
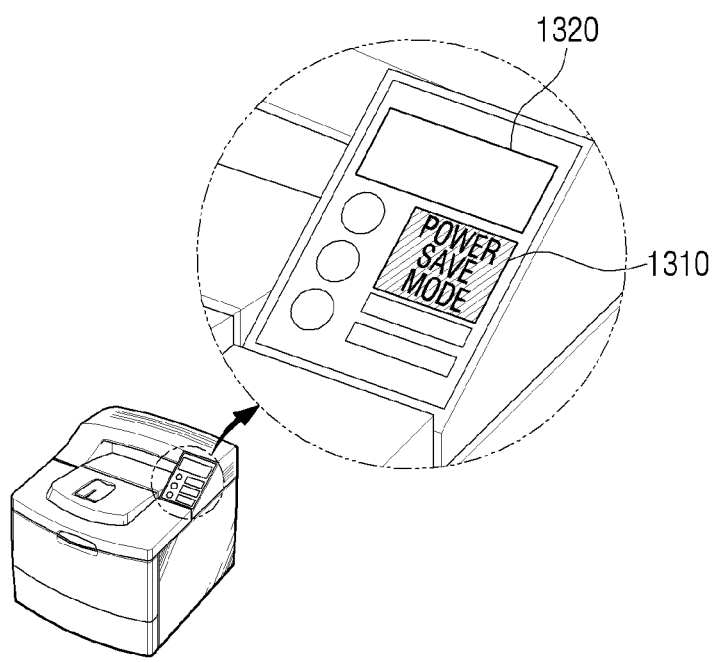
FIGS. 13 and 14 are diagrams illustrating an operation mode change of the image forming apparatus according to a user command according to exemplary embodiments of the present general inventive concept.
Figure 14:
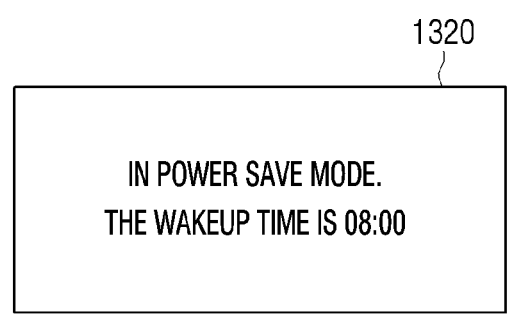

FIGS. 13 and 14 are diagrams illustrating the operation mode change of the image forming apparatus according to the user command according to an exemplary embodiment of the present general inventive concept.

Referring to FIG. 13, the sub image forming apparatus 100 can include a button 1310 to enter the power save mode or the normal mode according to the user command. When the button 1310 is pressed while the sub image forming apparatus 100 is in the normal mode, the sub image forming apparatus 100 can enter the power save mode. When the button 1310 is pressed while the sub image forming apparatus 100 is in the power save mode, the sub image forming apparatus 100 can enter the normal mode and perform the image printing job by receiving the image data from the main image forming apparatus 200.

When the user presses the button 1310, the operation mode change of the sub image forming apparatus 100 can be displayed through a display 1320 of the sub image forming apparatus 100. For example, when the user presses the button 1310 in the normal mode, the display 1320 can provide a display screen including an object, such as "In power save mode. Wakeup time is 08:00", indicating the status of the image forming apparatus as illustrated in FIG. 14.

While the button to switch from the normal mode to the power save mode is the same as the button to switch from the power save mode the normal mode in FIGS. 13 and 14, different buttons can be used according to various implementations. While the user changes the operation mode of the sub image forming apparatus 100 through the button of the sub image forming apparatus 100 in FIGS. 13 and 14, the user may change the operation mode of the sub image forming apparatus 100 through the server or the computer connected to the sub image forming apparatus 100.

Figure 15:
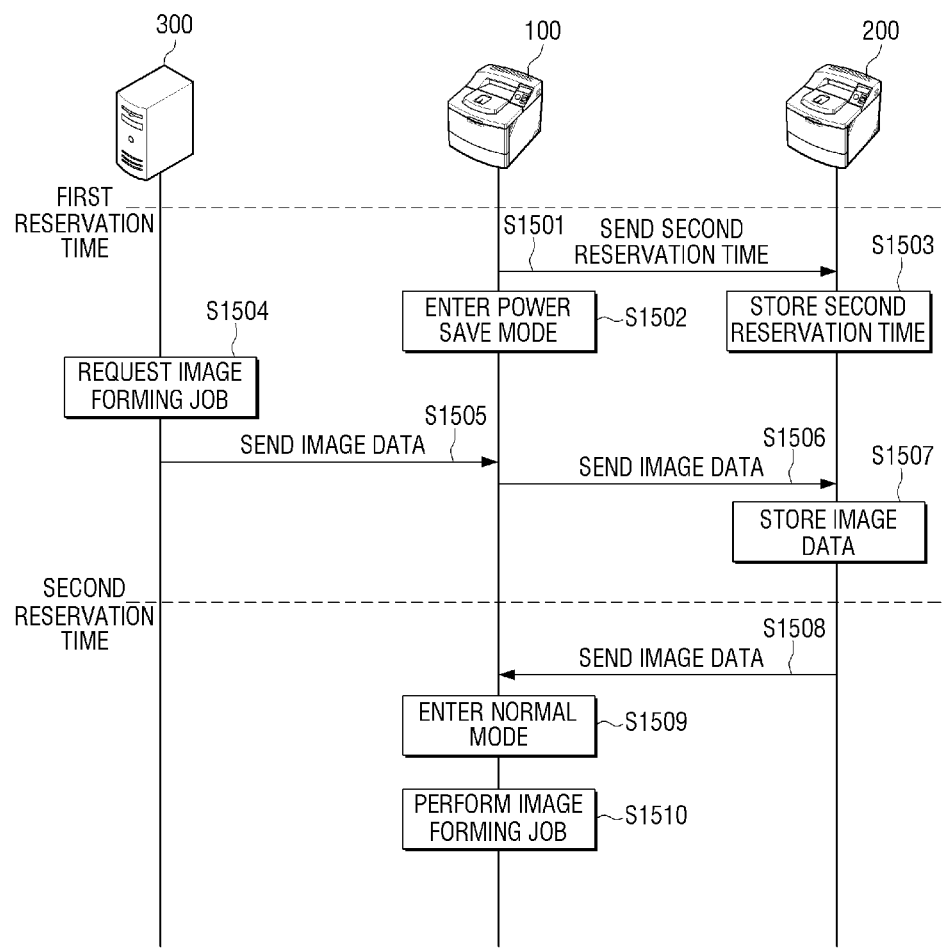
FIGS. 15 through 28 are sequence diagrams illustrating job execution methods according to various exemplary embodiments of the present general inventive concept.

FIG. 15 is a sequence diagram illustrating the job execution method according to one exemplary embodiment of the present general inventive concept. Particularly, as illustrated in FIG. 15, the main image forming apparatus 200 receives and stores the second reservation time information from the sub image forming apparatus 100, determines whether the second reservation time has arrived, and sends the image data to the sub image forming apparatus 100 once the second reservation time has arrived.

At the first reservation time, the sub image forming apparatus 100 sends information on the second reservation time to switch from the power save mode to the normal mode to the main image forming apparatus 200 (operation S1501) and enters the power save mode (operation S1502).

Herein, to send the second reservation time information to the main image forming apparatus 200, the sub image forming apparatus 100 needs to know an IP address or a MAC address of the main image forming apparatus 200 in advance. The IP address or the MAC address of the main image forming apparatus 200 can be automatically transmitted to and stored in the sub image forming apparatus 100 when the main image forming apparatus 200 is designated in the process illustrated in FIGS. 8 and 9. Alternatively, the user can input the IP address or the MAC address of the main image forming apparatus 200 directly to the sub image forming apparatus 100.

The main image forming apparatus 200, receiving the second reservation time information from the sub image forming apparatus 100, stores the received second reservation time information (operation S1503).

Next, when the image forming job is requested to the host apparatus 300 (operation S1504), the host apparatus 300 sends the image data to the sub image forming apparatus 100 (operation S1505). Herein, the image forming job request can be an image forming job command such as a printing command or a fax printing command. The host apparatus 300 can generate the image data according to the image forming job request and send the image data to the sub image forming apparatus 100 in operation S1505. While in this exemplary embodiment of the present general inventive concept the host apparatus 300 sends only the image data to the sub image forming apparatus 100 according to the image forming job request, the host apparatus 300 can generate and send a job command to the sub image forming apparatus 100 and send the image data when a response signal is received from the sub image forming apparatus 100.

The sub image forming apparatus 100 sends the received image data to the main image forming apparatus 200 (operation S1506). Herein, the sub image forming apparatus 100 can send the received image data to the main image forming apparatus 200 in an First In First Out (FIFO) manner. When resending the image data to the main image forming apparatus 200, the sub image forming apparatus 100 can add a header indicating the status (for example, the normal mode operation) of the sub image forming apparatus 100.

Upon receiving the image data from the sub image forming apparatus 100, the main image forming apparatus 200 stores the received image data (operation S1507). While the single image forming job is requested from the host apparatus 300 in the exemplary embodiment illustrated in FIG. 15, operations S1504 through S1507 can be repeated when a plurality of image forming jobs is requested. Furthermore, the host apparatus 300 is not necessarily the same physical device, and the image forming job can be requested by various host apparatuses 300 such as a fax machine, a smart phone, or a computer.

As part of storing the received image data (operation S1507), the main image forming apparatus 200 can also store identification information (e.g., the IP address or the MAC address of the sub image forming apparatus 100) to identify the multiple sub image forming apparatuses 100 in the network.

Next, when the second reservation time arrives, the main image forming apparatus 200 sends the stored image data to the sub image forming apparatus 100 (operation S1508). In detail, the sub image forming apparatus 100 receiving the image data from the main image forming apparatus 200 enters the normal mode (operation S1509) and then performs the image forming job using the received image data (operation S1510).

Figure 16:
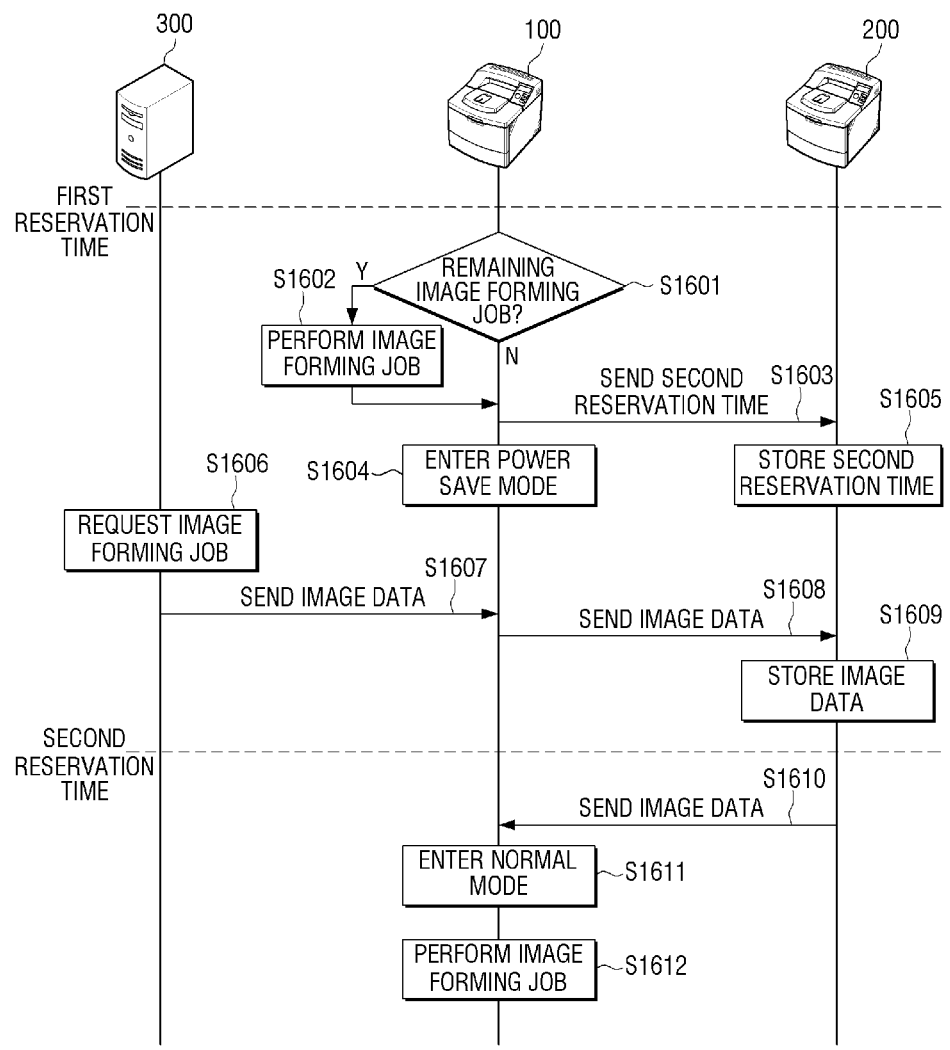

FIG. 16 is a sequence diagram illustrating the job execution method according to another exemplary embodiment of the present general inventive concept. Particularly, in FIG. 16, the sub image forming apparatus 100 processes the remaining image forming job and then enters the power save mode at the first reservation time.

When the first reservation time arrives, the sub image forming apparatus 100 determines whether there is any remaining image forming job (operation S1601). A remaining image forming job indicates a printing job or a fax job to receive and process before the sub image forming apparatus 100 switches to the power save mode. Meanwhile, a reserved printing job can be processed before the power save mode entrance by treating it as the remaining image forming job, or sent to and stored in the main image forming apparatus 200 to process it with other image forming jobs when the second reservation time passes.

If there is a remaining image forming job (operation S1601-Y), the sub image forming apparatus 100 performs the remaining image forming job (operation S1602).

When there is no remaining image forming job (operation S1601-N) or every remaining image forming job is processed, the sub image forming apparatus 100 sends information on the second reservation time to switch from the power save mode to the normal mode to the main image forming apparatus 200 (operation S1603) and enters the power save mode (operation S1604).

The main image forming apparatus 200, receiving the second reservation time information from the sub image forming apparatus 100, stores the received second reservation time information (operation S1605).

Next, when the image forming job is requested to the host apparatus 300 (operation S1606), the host apparatus 300 sends the image data to the sub image forming apparatus 100 (operation S1607). Herein, the image forming job request can be the image forming job command such as a printing command or a fax printing command. The host apparatus 300 can generate the image data according to the image forming job request and send the image data to the sub image forming apparatus 100. While in the exemplary embodiment illustrated in FIG. 16 the host apparatus 300 sends only the image data to the sub image forming apparatus 100 according to the image forming job request, the host apparatus 300 can generate and send the job command to the sub image forming apparatus 100 and send the image data when the response signal is received from the sub image forming apparatus 100

The sub image forming apparatus 100 sends the received image data to the main image forming apparatus 200 (operation S1608). Upon receiving the image data from the sub image forming apparatus 100, the main image forming apparatus 200 stores the received image data (operation S1609). While the single image forming job is requested from the host apparatus 300 is illustrated in FIG. 16, operations S1606 through S1609 can be repeated when a plurality of image forming jobs is requested. Furthermore, the host apparatus 300 is not necessarily the same physical device, and the image forming job can be requested by various host apparatuses 300 such as a fax machine, a smart phone, and a computer.

Next, when the second reservation time arrives, the main image forming apparatus 200 sends the stored image data to the sub image forming apparatus 100 (operation S1610). The sub image forming apparatus 100 receiving the image data enters the normal mode (operation S1611) and then performs the image forming job using the received image data (operation S1612).

Figure 17:
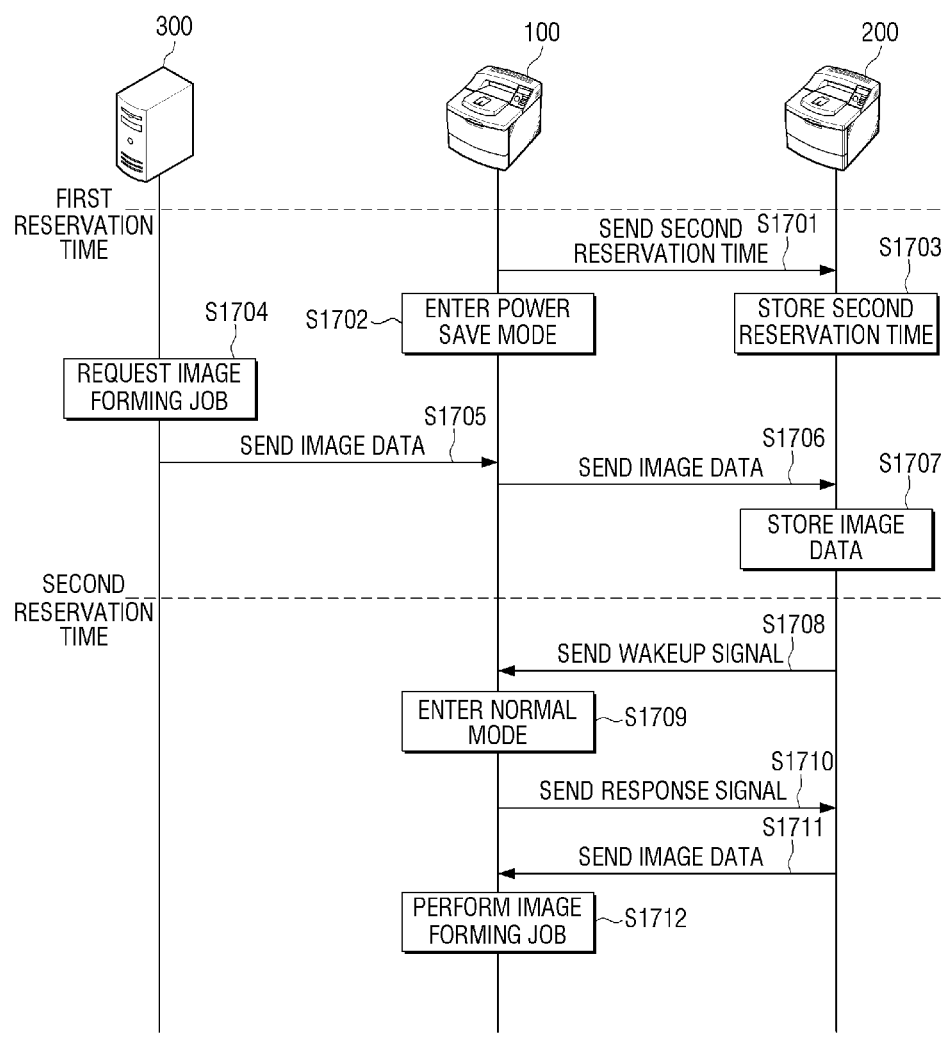

FIG. 17 is a sequence diagram illustrating the job execution method according to yet another exemplary embodiment of the present general inventive concept. Particularly, as illustrated in FIG. 17, the main image forming apparatus 200 receives and stores the second reservation time information from the sub image forming apparatus 100, determines whether the second reservation time arrives, sends a wakeup signal to the sub image forming apparatus 100, checks the status of the sub image forming apparatus 100, and then sends the image data.

At the first reservation time, the sub image forming apparatus 100 sends information on the second reservation time to switch from the power save mode to the normal mode to the main image forming apparatus 200 (operation S1701) and enters the power save mode (operation S1702).

The main image forming apparatus 200, receiving the second reservation time information from the sub image forming apparatus 100, stores the received second reservation time information (operation S1703).

Next, when the image forming job is requested to the host apparatus 300 (operation S1704), the host apparatus 300 sends the image data to the sub image forming apparatus 100 (operation S1705). Herein, the image forming job request can be the image forming job command such as a printing command or a fax printing command. The host apparatus 300 can generate the image data according to the image forming job request and send the image data to the sub image forming apparatus 100. While in the exemplary embodiment illustrated in FIG. 17 the host apparatus 300 sends only the image data to the sub image forming apparatus 100 according to the image forming job request, the host apparatus 300 can generate and send the job command to the sub image forming apparatus 100 and send the image data when the response signal is received from the sub image forming apparatus 100.

The sub image forming apparatus 100 sends the received image data to the main image forming apparatus 200 (operation S1706). Upon receiving the image data from the sub image forming apparatus 100, the main image forming apparatus 200 stores the received image data (operation S1707). While the single image forming job is requested from the host apparatus 300 is illustrated in FIG. 17, operations S1704 through S1707 can be repeated when a plurality of image forming jobs is requested. Furthermore, the host apparatus 300 is not necessarily the same physical device, and the image forming job can be requested by various host apparatuses 300 such as a fax machine, a smart phone, and a computer.

When the second reservation time arrives, the main image forming apparatus 200 sends the wakeup signal to the sub image forming apparatus 100 (operation S1708). The sub image forming apparatus 100 receiving the wakeup signal enters the normal mode (operation S1709). The sub image forming apparatus 100 sends a response signal indicating the normal mode entrance to the main image forming apparatus 200 in response to the wakeup signal (operation S1710). The main image forming apparatus 200 receiving the response signal sends the stored image data to the sub image forming apparatus 100 (operation S1711). The sub image forming apparatus 100 performs the image forming job using the received image data (operation S1712).

The main image forming apparatus 200 can send the wakeup signal to the sub image forming apparatus 100 even when there is no image data to send to the sub image forming apparatus 100. When the second reservation time arrives, the sub image forming apparatus 100 can enter the normal mode.

Figure 18:
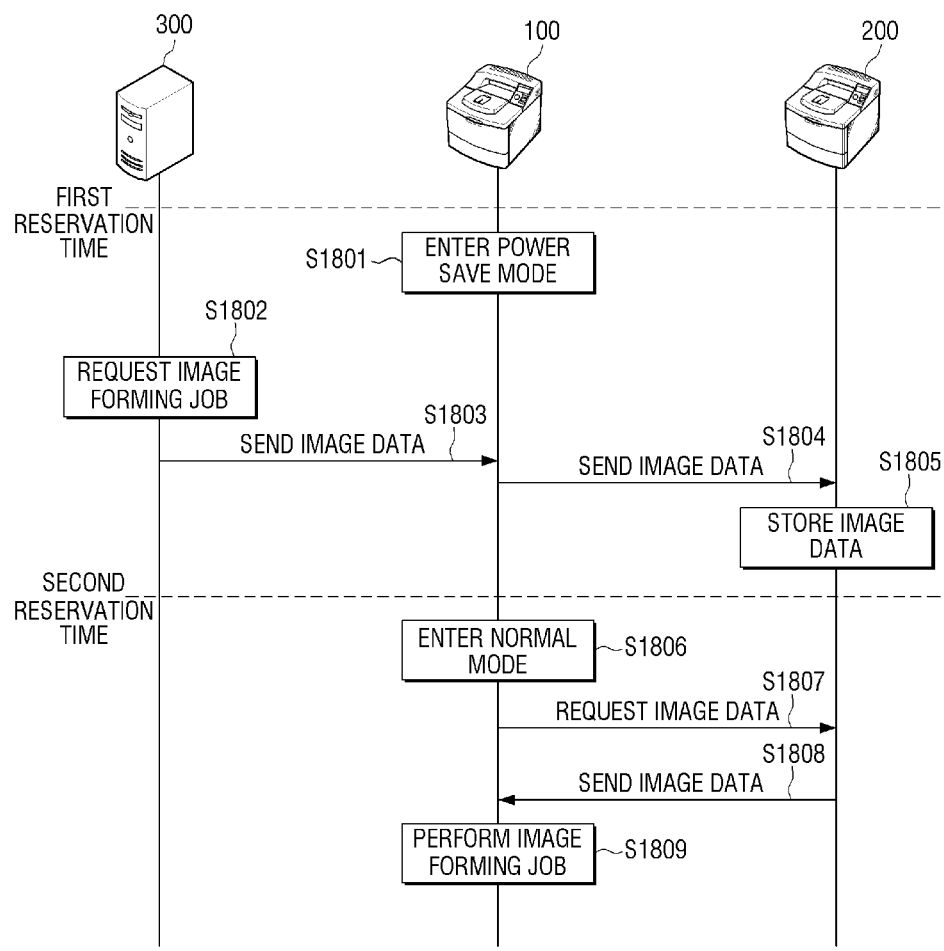

FIG. 18 is a sequence diagram illustrating the job execution method according to still another exemplary embodiment of the present general inventive concept. Particularly, in FIG. 18, the sub image forming apparatus 100 does not send the second reservation time information to the main image forming apparatus 200. When the second reservation time arrives, the sub image forming apparatus 100 automatically enters the normal mode and requests the image data from the main image forming apparatus 200.

At the first reservation time, the sub image forming apparatus 100 enters the power save mode (operation S1801).

Next, when the image forming job is requested to the host apparatus 300 (operation S1802), the host apparatus 300 sends the image data to the sub image forming apparatus 100 (operation S1803). Herein, the image forming job request can be the image forming job command such as a printing command or a fax printing command. The host apparatus 300 can generate the image data according to the image forming job request and send the image data to the sub image forming apparatus 100. While in the exemplary embodiment illustrated in FIG. 18 the host apparatus 300 sends only the image data to the sub image forming apparatus 100 according to the image forming job request, the host apparatus 300 can generate and send the job command to the sub image forming apparatus 100 and send the image data when the response signal is received from the sub image forming apparatus 100.

The sub image forming apparatus 100 sends the received image data to the main image forming apparatus 200 (operation S1804). Upon receiving the image data from the sub image forming apparatus 100, the main image forming apparatus 200 stores the received image data (operation S1805). While the single image forming job is requested from the host apparatus 300 is illustrated in FIG. 18, operations S1802 through S1805 can be repeated when multiple image forming jobs are requested. Furthermore, the host apparatus 300 is not necessarily the same physical device, and the image forming job can be requested by various host apparatuses 300 such as fax machine, smart phone, and computer.

Next, when the second reservation time arrives, the sub image forming apparatus 100 automatically enters the normal mode (operation S1806) and requests the image data from the main image forming apparatus (operation S1807). Herein, the signal requesting the image data may notify the normal mode operation of the sub image forming apparatus 100.

The main image forming apparatus 200 receiving the image data request signal sends the stored image data to the sub image forming apparatus 100 (operation S1808). The sub image forming apparatus 100 performs the image forming job using the received image data (operation S1809).

Figure 19:
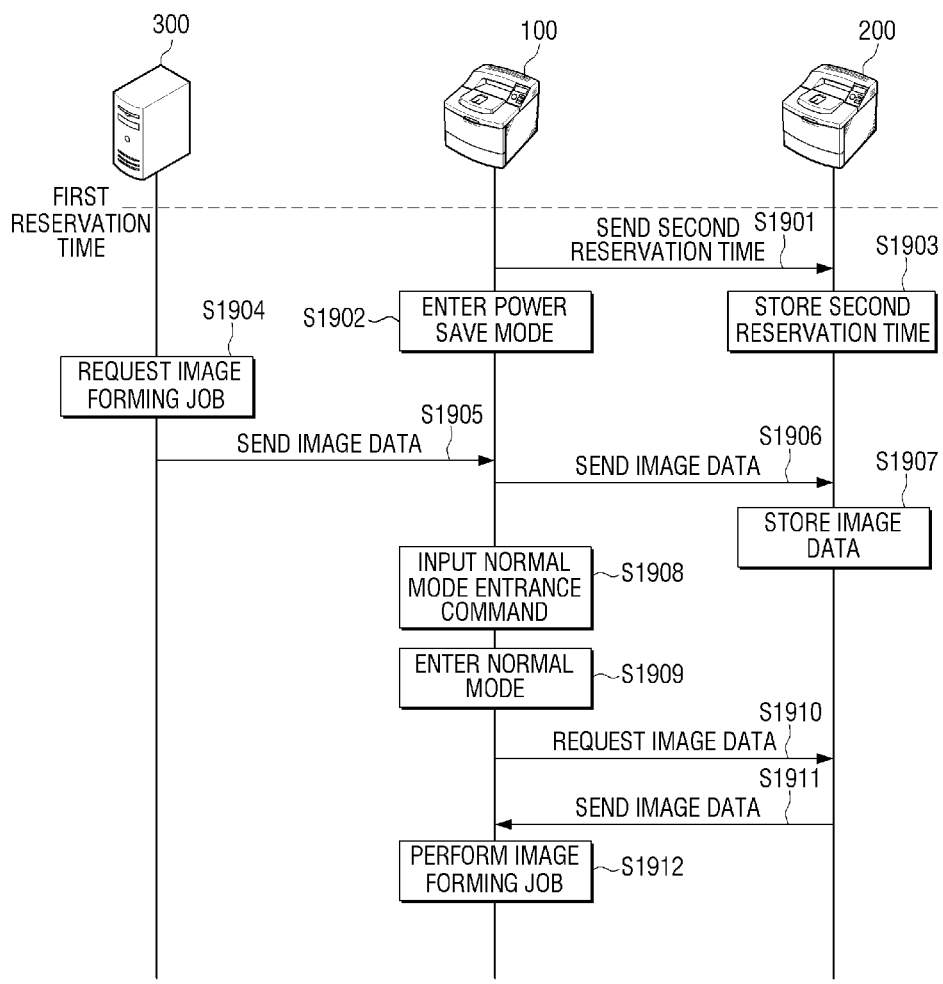

FIG. 19 is a sequence diagram illustrating the job execution method according to a further exemplary embodiment of the present general inventive concept. Particularly, as illustrated in FIG. 19, when the user inputs a normal mode entrance command before the second reservation time, the sub image forming apparatus 100 enters the normal mode and requests the image data from the main image forming apparatus 200.

At the first reservation time, the sub image forming apparatus 100 sends information on the second reservation time to switch from the power save mode to the normal mode to the main image forming apparatus 200 (operation S1901) and enters the power save mode (operation S1902).

The main image forming apparatus 200, receiving the second reservation time information from the sub image forming apparatus 100, stores the received second reservation time information (operation S1903).

Next, when the image forming job is requested to the host apparatus 300 (operation S1904), the host apparatus 300 sends the image data to the sub image forming apparatus 100 (operation S1905). Herein, the image forming job request can be the image forming job command such as a printing command or a fax printing command. The host apparatus 300 can generate the image data according to the image forming job request and send the image data to the sub image forming apparatus 100. While in the exemplary embodiment illustrated in FIG. 19 the host apparatus 300 sends only the image data to the sub image forming apparatus 100 according to the image forming job request, the host apparatus 300 can generate and send the job command to the sub image forming apparatus 100 and send the image data when the response signal is received from the sub image forming apparatus 100.

The sub image forming apparatus 100 sends the received image data to the main image forming apparatus 200 (operation S1906). Upon receiving the image data from the sub image forming apparatus 100, the main image forming apparatus 200 stores the received image data (operation S1907). While the single image forming job is requested from the host apparatus 300 in FIG. 19, operations S1904 through S1907 can be repeated when multiple image forming jobs are requested. Furthermore, the host apparatus 300 is not necessarily the same physical device, and the image forming job can be requested by various host apparatuses 300 such as fax machine, smart phone, and computer.

When the normal mode entrance command is input to the sub image forming apparatus 100 before the second reservation time (operation S1908), the sub image forming apparatus 100 enters the normal mode (operation S1909). Next, the sub image forming apparatus 100 requests the image data from the main image forming apparatus (operation S1910). Herein, the signal requesting the image data may notify the normal mode operation of the sub image forming apparatus 100.

The main image forming apparatus 200 receiving the image data request sends the stored image data to the sub image forming apparatus 100 (operation S1911). The sub image forming apparatus 100 performs the image forming job using the received image data (operation S1912).

Figure 20:
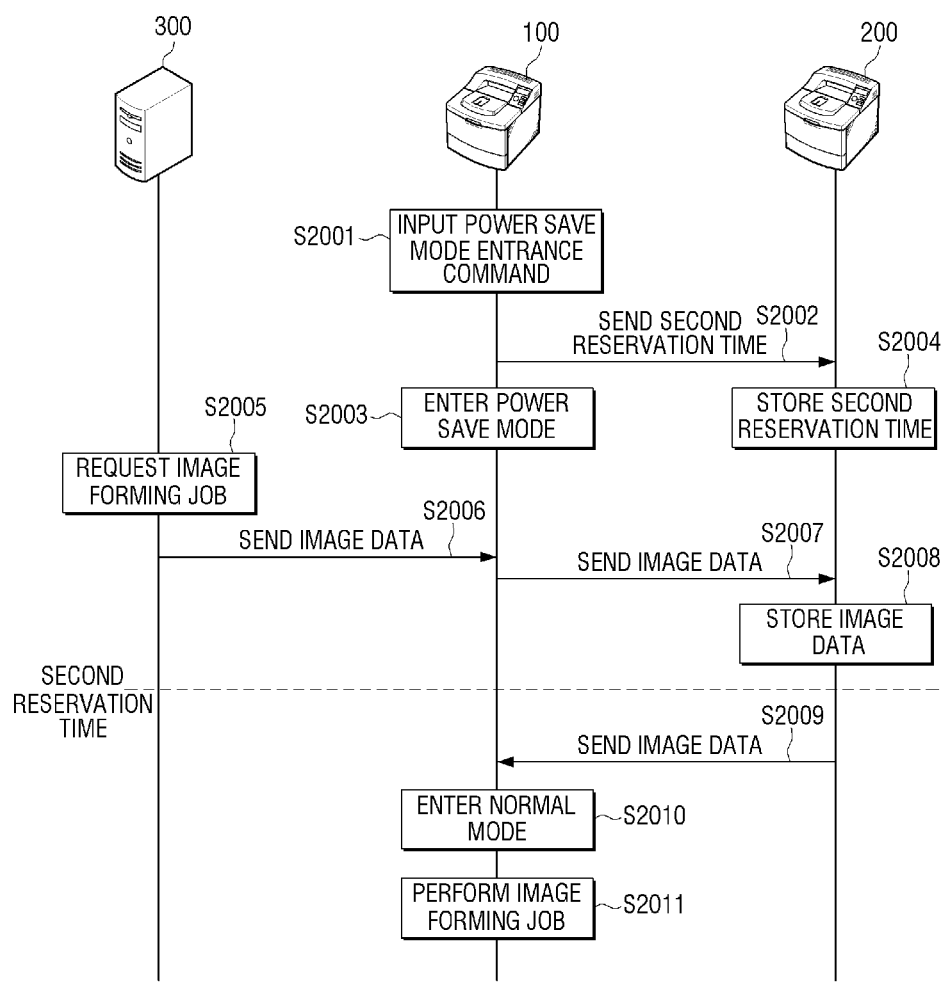

FIG. 20 is a sequence diagram illustrating the job execution method according to a further exemplary embodiment of the present general inventive concept. Particularly, as illustrated in FIG. 20, when the user inputs a power save mode entrance command before the first reservation time, the sub image forming apparatus 100 enters the power save mode and sends the second reservation time to the main image forming apparatus 200.

When the power save mode entrance command is input to the sub image forming apparatus 100 before the first reservation time (operation S2001), the sub image forming apparatus 100 sends the second reservation time information to switch from the power save mode to the normal mode, to the main image forming apparatus 200 (operation S2002) and enters the power save mode (operation S2003).

The main image forming apparatus 200, receiving the second reservation time information from the sub image forming apparatus 100, stores the received second reservation time information (operation S2004).

Next, when the image forming job is requested to the host apparatus 300 (operation S2005), the host apparatus 300 sends the image data to the sub image forming apparatus 100 (operation S2006). Herein, the image forming job request can be the image forming job command such as a printing command or a fax printing command. The host apparatus 300 can generate the image data according to the image forming job request and send the image data to the sub image forming apparatus 100. While in the exemplary embodiment illustrated in FIG. 20 the host apparatus 300 sends only the image data to the sub image forming apparatus 100 according to the image forming job request, the host apparatus 300 can generate and send the job command to the sub image forming apparatus 100 and send the image data when the response signal is received from the sub image forming apparatus 100.

The sub image forming apparatus 100 sends the received image data to the main image forming apparatus 200 (operation S2007). Upon receiving the image data from the sub image forming apparatus 100, the main image forming apparatus 200 stores the received image data (operation S2008). While the single image forming job is requested from the host apparatus 300 as illustrated in FIG. 20, operations S2005 through S2008 can be repeated when multiple image forming jobs are requested. Furthermore, the host apparatus 300 is not the same physical device, and the image forming job can be requested by various host apparatuses 300 such as fax machine, smart phone, and computer.

Next, when the second reservation time arrives, the main image forming apparatus 200 sends the stored image data to the sub image forming apparatus 100 (operation S2009). The sub image forming apparatus 100 receiving the image data enters the normal mode (operation S2010) and then performs the image forming job using the received image data (operation S2011).

As explained with regard to FIG. 5, the main image forming apparatus 200 can include a plurality of the memories 230. More specifically, the main image forming apparatus 200 can include the first memory 231, the second memory 232, and the flash memory 233. The memory being used can change according to the operation mode of the main image forming apparatus 200 and the storage space of the memory. Hereafter, various exemplary embodiments based on the operation mode of the main image forming apparatus 200 and the storage space of the memory 230 when the main image forming apparatus 200 stores the image data are described by referring to FIGS. 21 through 24.

Figure 21:
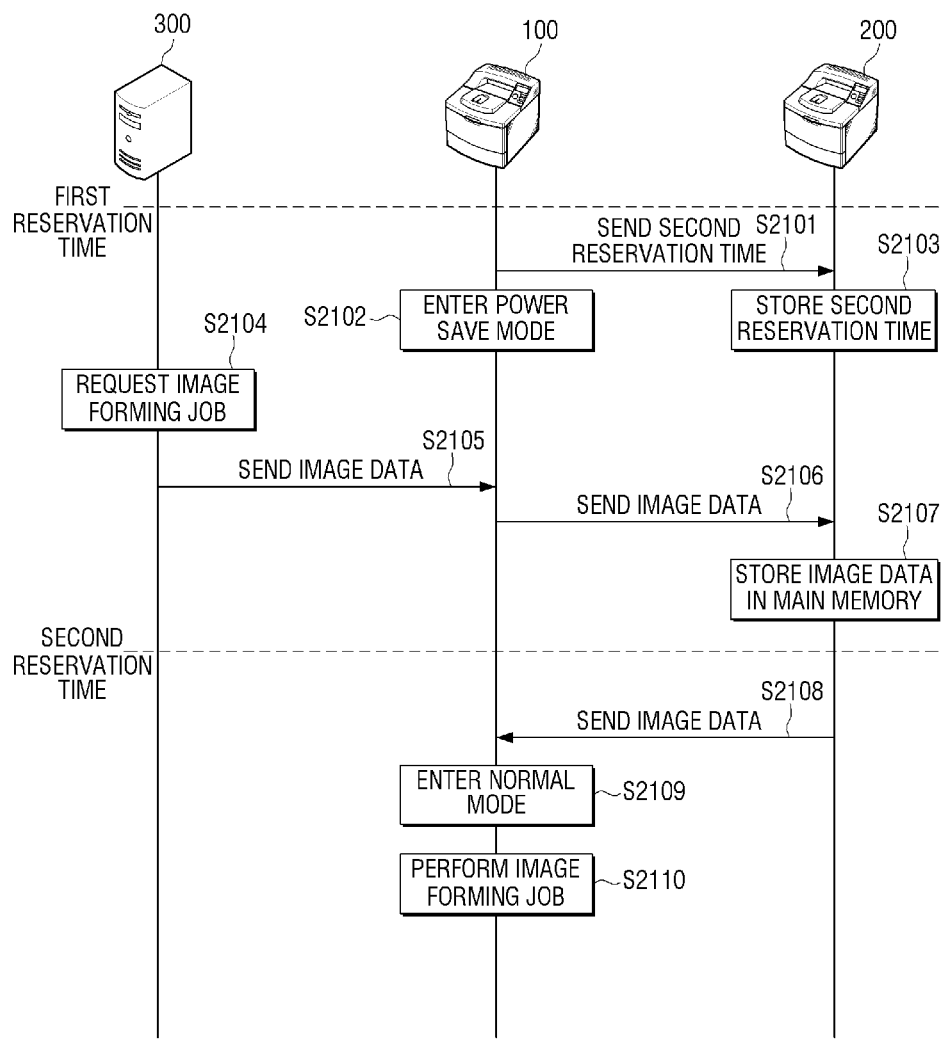

FIG. 21 is a sequence diagram illustrating the job execution method according to a further exemplary embodiment of the present general inventive concept. Particularly, as illustrated in FIG. 21, the main image forming apparatus 200 in the normal mode receives and stores the image data from the sub image forming apparatus 100.

At the first reservation time, the sub image forming apparatus 100 sends information on the second reservation time information to switch from the power save mode to the normal mode to the main image forming apparatus 200 (operation S2101) and enters the power save mode (operation S2102).

The main image forming apparatus 200, receiving the second reservation time information from the sub image forming apparatus 100, stores the received second reservation time information (operation S2103). In detail, the main image forming apparatus 200 in the normal mode can store the second reservation time information in the first memory 231.

Next, when the image forming job is requested to the host apparatus 300 (operation S2104), the host apparatus 300 sends the image data to the sub image forming apparatus 100 (operation S2105). Herein, the image forming job request can be the image forming job command such as a printing command or a fax printing command. The host apparatus 300 can generate the image data according to the image forming job request and send the image data to the sub image forming apparatus 100. While in the exemplary embodiment illustrated in FIG. 21 the host apparatus 300 sends only the image data to the sub image forming apparatus 100 according to the image forming job request, the host apparatus 300 can generate and send the job command to the sub image forming apparatus 100 and send the image data when the response signal is received from the sub image forming apparatus 100.

The sub image forming apparatus 100 sends the received image data to the main image forming apparatus 200 (operation S2106). Upon receiving the image data from the sub image forming apparatus 100, the main image forming apparatus 200 stores the received image data (operation S2107). In detail, when receiving the image data from the sub image forming apparatus 100 in the normal mode, the main image forming apparatus 200 can store the received image data in the first memory 231 being the main memory.

Meanwhile, when the main image forming apparatus 200 can operate in multiple power save modes, the first memory 231 can be activated even in one of the power save modes. For example, when the main CPU 221 and the function block to perform the image forming job are deactivated and the first memory 231 is activated in the power save mode, the main image forming apparatus 200, which is not in the normal mode, can store the received image data in the first memory 231.

While the single image forming job is requested from the host apparatus 300 as illustrated in FIG. 21, operations S2104 through S2107 can be repeated when multiple image forming jobs are requested. Furthermore, the host apparatus 300 is not the same physical device, and the image forming job can be requested by various host apparatuses 300 such as a fax machine, a smart phone, and a computer.

Next, when the second reservation time arrives, the main image forming apparatus 200 sends the image data stored in the first memory 231 to the sub image forming apparatus 100 (operation S2108). The sub image forming apparatus 100 receiving the image data enters the normal mode (operation S2109) and then performs the image forming job using the received image data (operation S2110).

Figure 22:
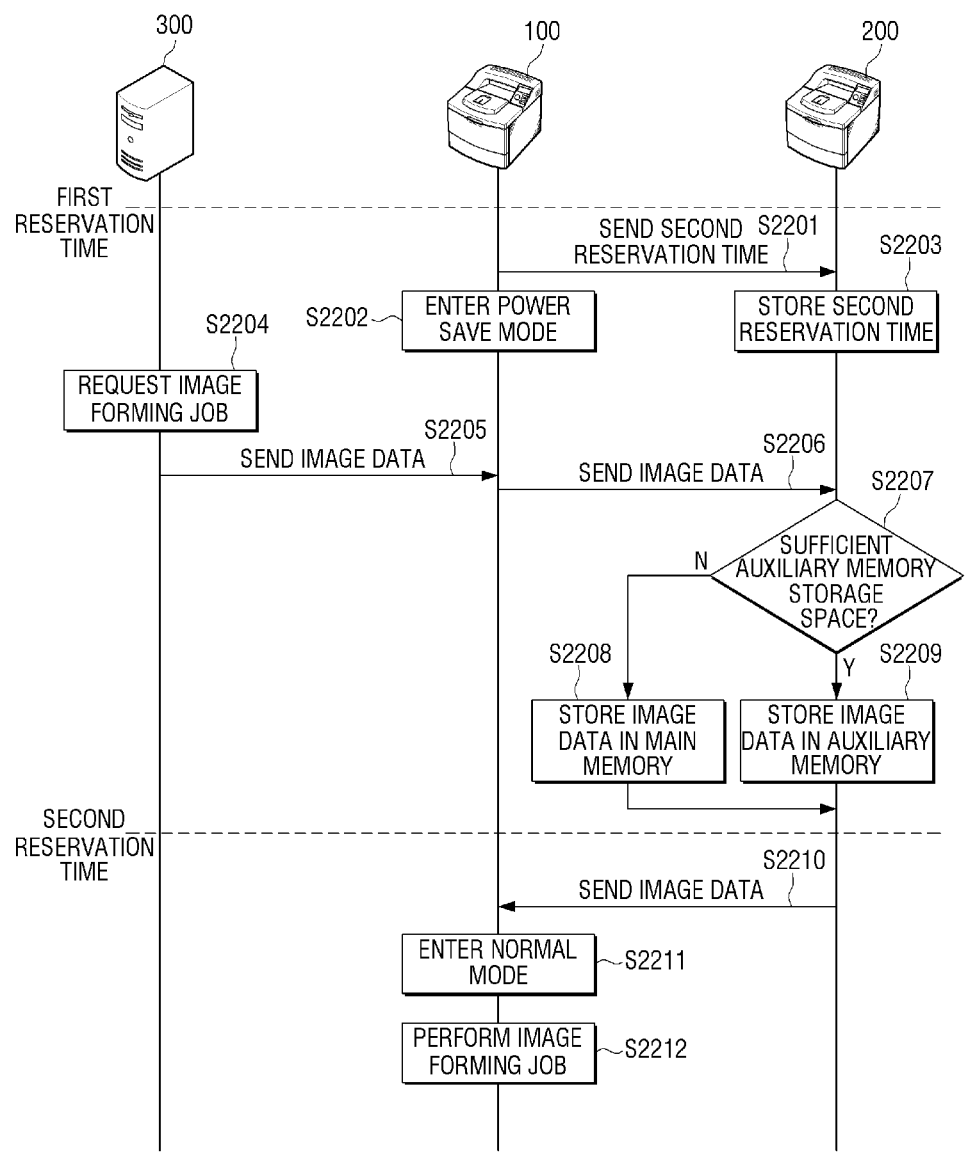

FIG. 22 is a sequence diagram illustrating the job execution method according to a further exemplary embodiment of the present general inventive concept. Particularly, in FIG. 22, when the main image forming apparatus 200 in the power save mode receives and stores the image data from the sub image forming apparatus 100, the image data is stored in the first memory 231 because of the lack of the storage space of the second memory 232 (corresponding to an auxiliary memory).

At the first reservation time, the sub image forming apparatus 100 sends information on the second reservation time to switch from the power save mode to the normal mode to the main image forming apparatus 200 (operation S2201) and enters the power save mode (operation S2202).

The main image forming apparatus 200, receiving the second reservation time information from the sub image forming apparatus 100, stores the received second reservation time information (operation S2203). In detail, the main image forming apparatus 200 in the power save mode can store the second reservation time information in the second memory 232.

Next, when the image forming job is requested to the host apparatus 300 (operation S2204), the host apparatus 300 sends the image data to the sub image forming apparatus 100 (operation S2205). Herein, the image forming job request can be the image forming job command such as a printing command or a fax printing command. The host apparatus 300 can generate the image data according to the image forming job request and send the image data to the sub image forming apparatus 100. While in the exemplary embodiment illustrated in FIG. 22 the host apparatus 300 sends only the image data to the sub image forming apparatus 100 according to the image forming job request, the host apparatus 300 can generate and send the job command to the sub image forming apparatus 100 and send the image data when the response signal is received from the sub image forming apparatus 100.

The sub image forming apparatus 100 sends the received image data to the main image forming apparatus 200 (operation S2206). Upon receiving the image data from the sub image forming apparatus 100 in the power save mode, the main image forming apparatus 200 determines whether the auxiliary memory 232 has sufficient storage space to store the image data (operation S2207). In detail, when receiving the image data from the sub image forming apparatus 100 in the power save mode, the main image forming apparatus 200 can determine whether the auxiliary memory 232 has sufficient storage space to store the image data by comparing the data size of the received image data and the remaining storage space of the auxiliary memory 232.

When the auxiliary memory 232 is determined to have sufficient storage space (operation S2207-Y), the main image forming apparatus 200 stores the received image data in the second memory 232 being the auxiliary memory (operation S2208). When the auxiliary memory 232 is determined to have insufficient storage space (operation S2207-N), the main image forming apparatus 200 can store the image data in the first memory 231 (corresponding to the main memory) (operation S2209).

Meanwhile, when the main image forming apparatus 200 operates in the power save mode, the first memory 231 can be deactivated. In this case, the sub CPU 222 of the main image forming apparatus 200 in the power save mode can store the image data by activating the first memory 231. That is, the sub CPU 222 of the main image forming apparatus 200 can store the image data by activating only the first memory 231, without switching the main image forming apparatus 200 to the normal mode.

While the single image forming job is requested from the host apparatus 300 is illustrated in FIG. 22, operations S2204 through S2209 can be repeated when multiple image forming jobs are requested. Furthermore, the host apparatus 300 is not necessarily the same physical device, and the image forming job can be requested by various host apparatuses 300 such as fax machine, smart phone, and computer.

Next, when the second reservation time arrives, the main image forming apparatus 200 sends the image data stored in the first memory 231 or the second memory 232 to the sub image forming apparatus 100 (operation S2210). The sub image forming apparatus 100 receiving the image data enters the normal mode (operation S2211) and then performs the image forming job using the received image data (operation S2212).

Figure 23:
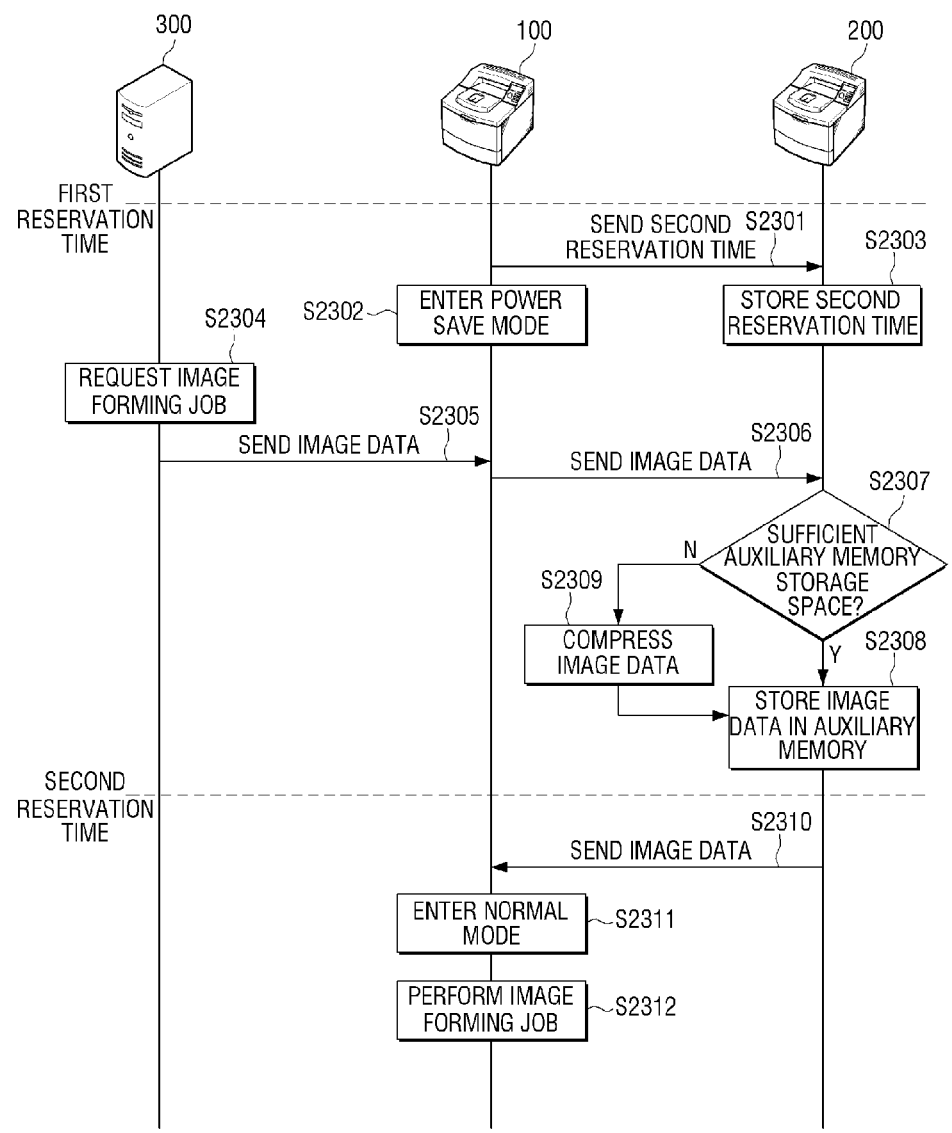

FIG. 23 is a sequence diagram illustrating the job execution method according to a further exemplary embodiment of the present general inventive concept. Particularly, in FIG. 23, when the main image forming apparatus 200 in the power save mode receives and stores the image data from the sub image forming apparatus 100, the image data is compressed and stored because of the lack of the storage space of the second memory 232 (corresponding to an auxiliary memory).

At the first reservation time, the sub image forming apparatus 100 sends information on the second reservation time to switch from the power save mode to the normal mode to the main image forming apparatus 200 (operation S2301) and enters the power save mode (operation S2302).

The main image forming apparatus 200, receiving the second reservation time information from the sub image forming apparatus 100, stores the received second reservation time information (operation S2303). In detail, the main image forming apparatus 200 in the power save mode can store the second reservation time information in the second memory 232.

Next, when the image forming job is requested to the host apparatus 300 (operation S2304), the host apparatus 300 sends the image data to the sub image forming apparatus 100 (operation S2305). Herein, the image forming job request can be the image forming job command such as a printing command or a fax printing command. The host apparatus 300 can generate the image data according to the image forming job request and send the image data to the sub image forming apparatus 100. While in the exemplary embodiment illustrated in FIG. 23 the host apparatus 300 sends only the image data to the sub image forming apparatus 100 according to the image forming job request, the host apparatus 300 can generate and send the job command to the sub image forming apparatus 100 and send the image data when the response signal is received from the sub image forming apparatus 100.

The sub image forming apparatus 100 sends the received image data to the main image forming apparatus 200 (operation S2306). Upon receiving the image data from the sub image forming apparatus 100 in the power save mode, the main image forming apparatus 200 determines whether the auxiliary memory 232 has sufficient storage space to store the image data (operation S2307). In detail, when receiving the image data from the sub image forming apparatus 100 in the power save mode, the main image forming apparatus 200 can determine whether the second memory 232 has sufficient storage space to store the received image data by comparing the data size of the received image data and the remaining storage space of the second memory 232.

When it is determined that the second memory 232 has sufficient storage space (operation S2307-Y), the main image forming apparatus 200 stores the received image data in the auxiliary memory 232 (operation S2308).

When it is determined that the auxiliary memory 232 has insufficient storage space (operation S2307-N), the main image forming apparatus 200 can compress the image data (operation S2309) and store the compressed image data in the second memory 232 (operation S2308). If it is determined that the second memory 232 lacks the storage space for the compressed image data, the main image forming apparatus 200 can apply lossy compression to the image data, or reduce a resolution of the image data (e.g., reduce 600 dpi to 300 dpi) and then compress the image data of the reduced resolution, and thus store the compressed image data in the second memory 232.

Meanwhile, when the main image forming apparatus 200 operates in the power save mode, the sub CPU 222 can control the main image forming apparatus 200 and processes to compress the data or to reduce the resolution. To reduce the power consumption, the sub CPU 222 in the power save mode can use a processor of lower performance (and hence lower power consumption) than the main CPU 221 so as to operate with the lower power than the main CPU 221. As a result, the data compression can be delayed. Hence, the main image forming apparatus 200 can further include a hardware CODEC to back up the sub CPU 222 in the data compression, and can address the delay of the sub CPU 222 by compressing the data using the hardware CODEC.

While the single image forming job is requested from the host apparatus 300 in the exemplary embodiment illustrated in in FIG. 23, operations S2304 through S2309 can be repeated when multiple image forming jobs are requested. Furthermore, the host apparatus 300 is not the physically same device, and the image forming job can be requested by various host apparatuses 300 such as a fax machine, a smart phone, and a computer.

Next, when the second reservation time arrives, the main image forming apparatus 200 sends the image data stored in the second memory 232 to the sub image forming apparatus 100 (operation S2310). The sub image forming apparatus 100 receiving the image data enters the normal mode (operation S2311) and then performs the image forming job using the received image data (operation S2312).

Figure 24:
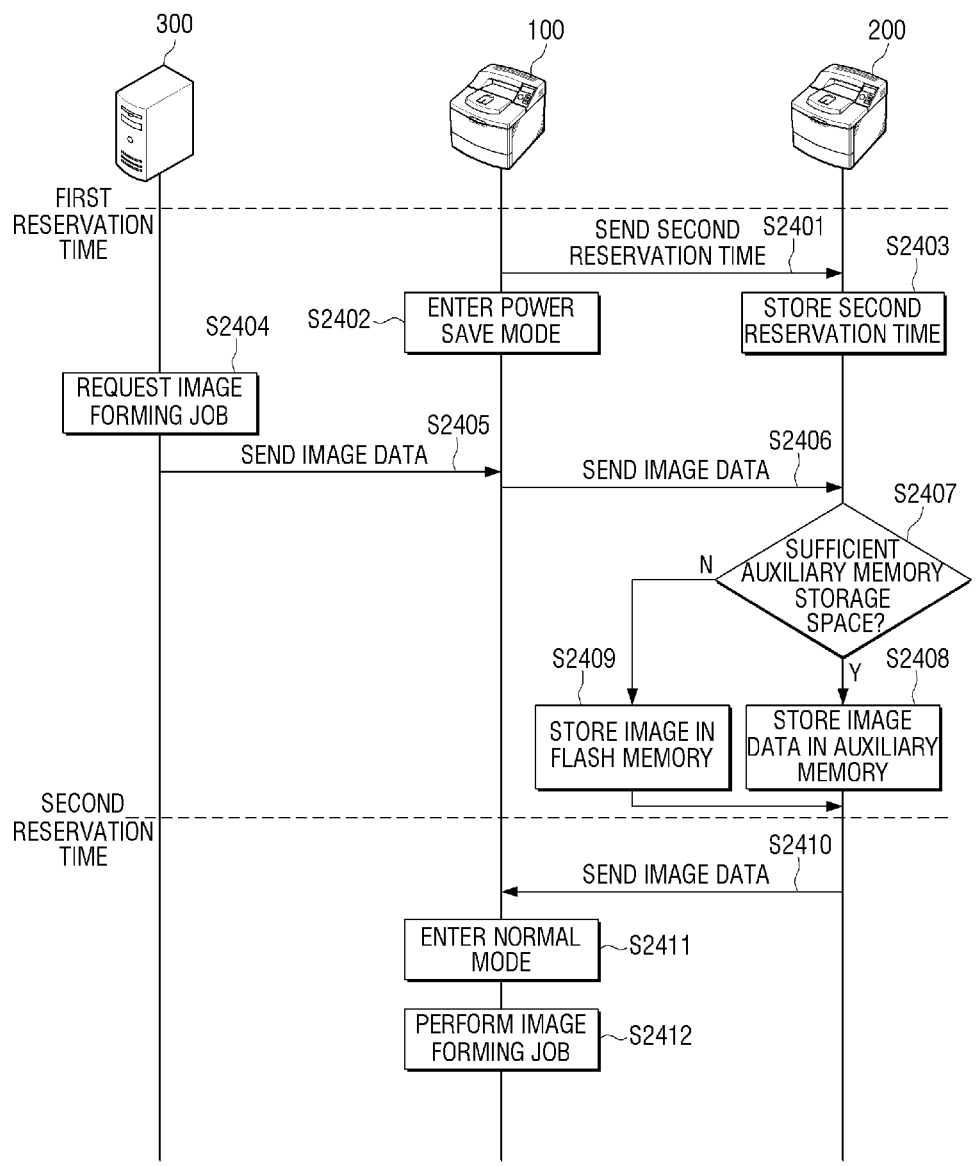

FIG. 24 is a sequence diagram illustrating the job execution method according to a further exemplary embodiment of the present general inventive concept. Particularly, as illustrated in FIG. 24, when the main image forming apparatus 200 in the power save mode receives and stores the image data from the sub image forming apparatus 100, the image data is stored in the flash memory 233 because of the lack of the storage space of the second memory 232 (corresponding to an auxiliary memory).

At the first reservation time, the sub image forming apparatus 100 sends information on the second reservation time information to switch from the power save mode to the normal mode to the main image forming apparatus 200 (operation S2401) and enters the power save mode (operation S2402).

The main image forming apparatus 200, receiving the second reservation time information from the sub image forming apparatus 100, stores the received second reservation time information (operation S2403). In detail, the main image forming apparatus 200 in the power save mode can store the second reservation time information in the second memory 232.

Next, when the image forming job is requested to the host apparatus 300 (operation S2404), the host apparatus 300 sends the image data to the sub image forming apparatus 100 (operation S2405). Herein, the image forming job request can be the image forming job command such as a printing command or a fax printing command. The host apparatus 300 can generate the image data according to the image forming job request and send the image data to the sub image forming apparatus 100. While in the exemplary embodiment illustrated in FIG. 24 the host apparatus 300 sends only the image data to the sub image forming apparatus 100 according to the image forming job request, the host apparatus 300 can generate and send the job command to the sub image forming apparatus 100 and send the image data when the response signal is received from the sub image forming apparatus 100.

The sub image forming apparatus 100 sends the received image data to the main image forming apparatus 200 (operation S2406). Upon receiving the image data from the sub image forming apparatus 100 in the power save mode, the main image forming apparatus 200 determines whether the second memory 232 (corresponding to the auxiliary memory) has the sufficient storage space to store the image data (operation S2407). In detail, when receiving the image data from the sub image forming apparatus 100 in the power save mode, the main image forming apparatus 200 can determine whether the auxiliary memory 232 has the sufficient storage space to store the received image data by comparing the data size of the received image data and the remaining storage space of the second memory 232.

When it is determined that the auxiliary memory 232 has sufficient storage space (operation S2407-Y), the main image forming apparatus 200 stores the received image data in the auxiliary memory 232 (operation S2408).

When it is determined that the second memory 232 has insufficient storage space (operation S2407-N), that is, when the image data size is greater than the remaining storage space of the second memory 232, the main image forming apparatus 200 can store the image data in the flash memory 233 (operation S2409). Herein, when the auxiliary memory 232 lacks the storage space to store the received image data, part of the image data may be stored in the auxiliary memory 232 and the remaining image data may be stored in the flash memory 233. In more detail, the image data includes a document header, a page header, and page data. The main image forming apparatus 200 can read information such as number of pages of the image data and data size of each page by checking the document header and the page header. Among the multiple pages, data of the pages storable in the second memory 232 are stored in the second memory 232, and data of the other pages can be stored in the flash memory 233. Herein, a flash memory address containing the header and the other page data is recorded in the second memory 232 to prevent errors in the data reading.

While the single image forming job is requested from the host apparatus 300 is illustrated in FIG. 24, operations S2404 through S2409 can be repeated when multiple image forming jobs are requested. Furthermore, the host apparatus 300 is not necessarily the same physical device, and the image forming job can be requested by various host apparatuses 300 such as a fax machine, a smart phone, and a computer.

Next, when the second reservation time arrives, the main image forming apparatus 200 sends the image data stored in the second memory 232 or the flash memory 233 to the sub image forming apparatus 100 (operation S2410). The sub image forming apparatus 100 receiving the image data enters the normal mode (operation S2411) and then performs the image forming job using the received image data (operation S2412).

Figure 25:
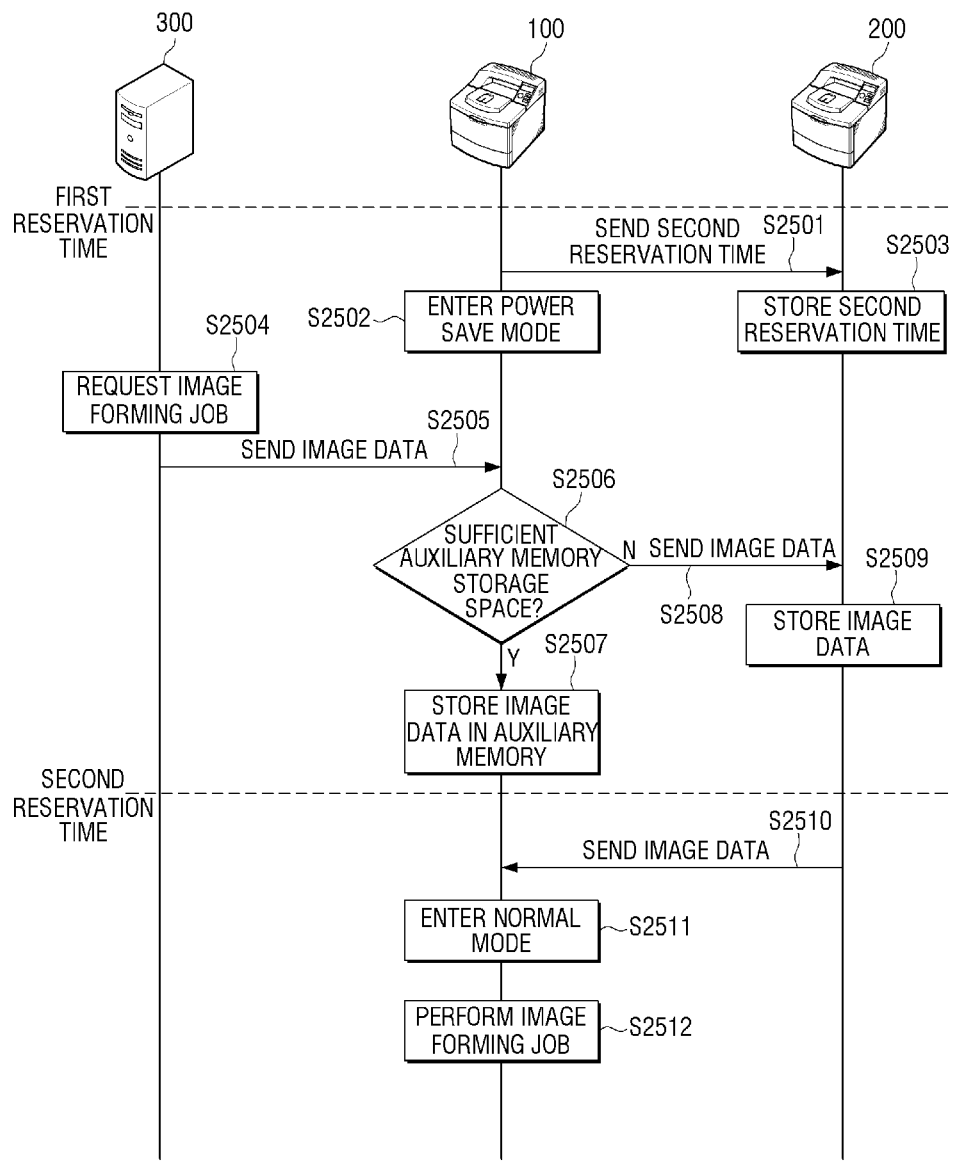

FIG. 25 is a sequence diagram illustrating the job execution method according to a further exemplary embodiment of the present general inventive concept. Particularly, in FIG. 25, when the sub image forming apparatus 100 receives the image data from the host apparatus 300, the image data is stored in the sub image forming apparatus 100. When the storage space is insufficient, the image data is sent to the main image forming apparatus 200.

At the first reservation time, the sub image forming apparatus 100 sends information on the second reservation time to switch from the power save mode to the normal mode to the main image forming apparatus 200 (operation S2501) and enters the power save mode (operation S2502).

The main image forming apparatus 200, receiving the second reservation time information from the sub image forming apparatus 100, stores the received second reservation time information (operation S2503).

Next, when the image forming job is requested to the host apparatus 300 (operation S2504), the host apparatus 300 sends the image data to the sub image forming apparatus 100 (operation S2505). Herein, the image forming job request can be the image forming job command such as a printing command or a fax printing command. The host apparatus 300 can generate the image data according to the image forming job request and send the image data to the sub image forming apparatus 100. While in this exemplary embodiment illustrated in FIG. 25 the host apparatus 300 sends only the image data to the sub image forming apparatus 100 according to the image forming job request, the host apparatus 300 can generate and send the job command to the sub image forming apparatus 100 and send the image data when the response signal is received from the sub image forming apparatus 100.

Upon receiving the image data from the host apparatus 300, the sub image forming apparatus 100 determines whether the second memory 112 (corresponding to an auxiliary memory) has the sufficient storage space to store the image data (operation S2506). In detail, when receiving the image data from the host apparatus 300 in the power save mode, the sub image forming apparatus 100 can determine whether the auxiliary memory 112 has sufficient storage space to store the received image data by comparing the data size of the received image data and the remaining storage space of the auxiliary memory 112.

When it is determined that the auxiliary memory 112 has sufficient storage space (operation S2506-Y), the sub image forming apparatus 100 stores the image data in the auxiliary memory 112 (operation S2507).

When it is determined that the auxiliary memory 112 has insufficient storage space (operation S2506-N), that is, when the image data size is greater than the remaining storage space of the second memory 112, the sub image forming apparatus 100 sends the image data to the main image forming apparatus 200 (operation S2508). The main image forming apparatus 200 receiving the image data from the sub image forming apparatus 100 stores the received image data (operation S2509).

While the single image forming job is requested from the host apparatus 300 in the exemplary embodiment illustrated in FIG. 25, operations S2504 through S2509 can be repeated when a plurality of image forming jobs is requested. Furthermore, the host apparatus 300 is not necessarily the same physical device, and the image forming job can be requested by various host apparatuses 300 such as a fax machine, a smart phone, and a computer.

Next, when the second reservation time arrives, the main image forming apparatus 200 sends the stored image data to the sub image forming apparatus 100 (operation S2510). In detail, the sub image forming apparatus 100 receiving the image data enters the normal mode (operation S2511) and then performs the image forming job using the received image data and the image data stored in the second memory 112 (operation S2512).

The method to store the image data received from the host apparatus 300 has been illustrated in FIGS. 21 through 25. When the memory 230 (which may include for example the first memory 231, the second memory 232, and the flash memory 233) of the main image forming apparatus 200 lacks the storage space to store the image data, the main image forming apparatus 200 can resend the received image data to the sub image forming apparatus 100. Herein, the main image forming apparatus 200 may attain sufficient storage space by sending not only the image data received when the memory 230 of the main image forming apparatus 200 lacks storage space, but also every image data received and stored after the first reservation time, to the sub image forming apparatus 100.

When receiving the image data, the sub image forming apparatus 100 can store the received image data in the second memory 112 or the flash memory 113. Alternatively, the sub image forming apparatus 100 can enter the normal mode, perform the image forming job, and then re-enter the power save mode. Alternatively, the sub image forming apparatus 100 may enter the normal mode, request the image data from the main image forming apparatus 200, and perform the image forming job of every image data to process.

Figure 26:
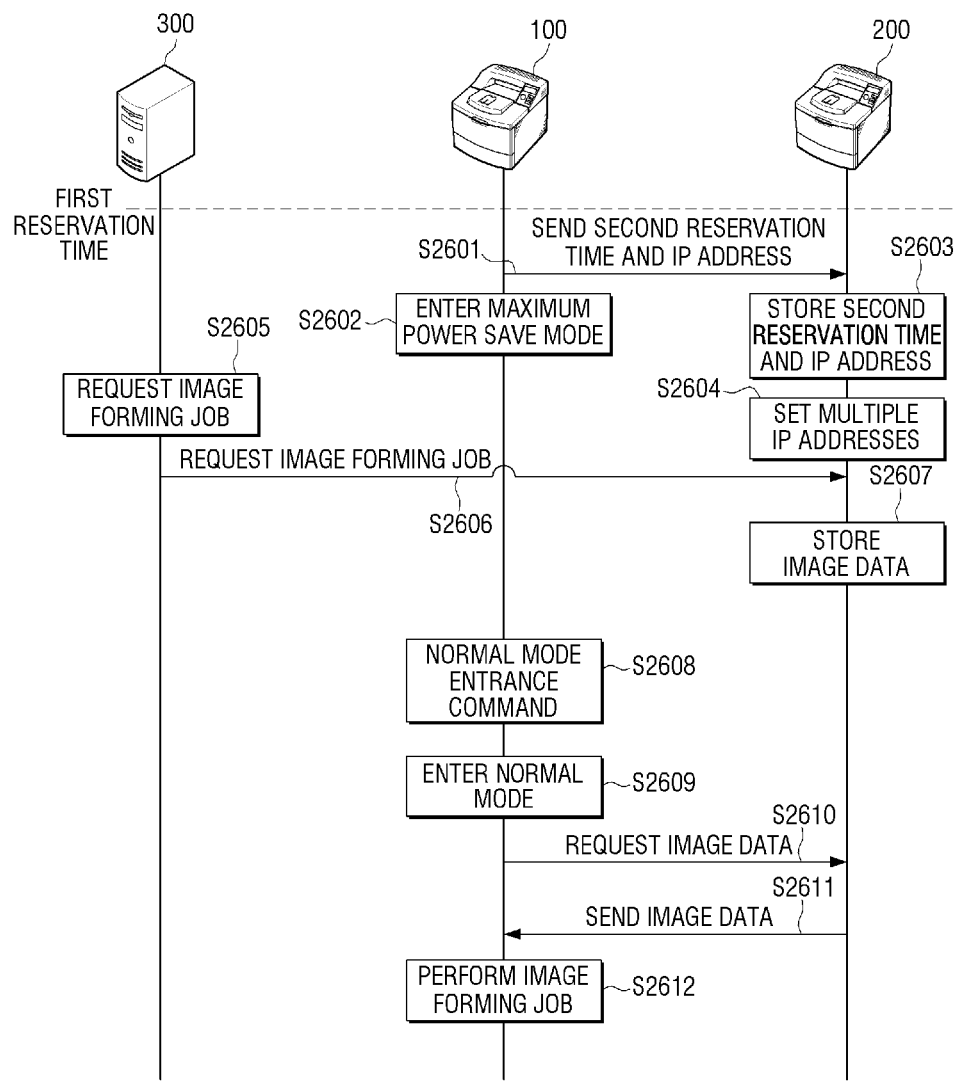

FIG. 26 is a sequence diagram illustrating the job execution method according to a further exemplary embodiment of the present general inventive concept. Particularly, in FIG. 26, when the main image forming apparatus 200 can obtain multiple IPs in the network, the IP address of the sub image forming apparatus 100 is sent to the main image forming apparatus 200 and the main image forming apparatus 200 receives the image data directly from the host apparatus 300 using the IP address of the sub image forming apparatus 100.

When the first reservation time arrives, the sub image forming apparatus 100 sends to the main image forming apparatus 200 the second reservation time information to switch from the power save mode to the normal mode and its IP address (operation S2601) and enters a maximum power save mode (operation S2602). Herein, the maximum power save mode signifies that all the power supplied to the sub image forming apparatus 100 is cut off, that is, the standby power of the sub image forming apparatus 100 is zero watts, or 0 W. In the maximum power save mode, the user can pull out a plug to supply the power to the sub image forming apparatus 100 out of a socket, or turn off the sub image forming apparatus 100. When the user inserts the plug into the socket or turns on the sub image forming apparatus 100 to supply the power, this can be recognized as the command to enter the normal mode.

The main image forming apparatus 200, receiving the second reservation time information and the IP address from the sub image forming apparatus 100, stores the received second reservation time information and IP address (operation S2603). Next, the main image forming apparatus 200 can set multiple IP addresses in the network using the IP address of the sub image forming apparatus 100 (operation S2604).

Next, when the image forming job is requested to the host apparatus 300 (operation S2605), the host apparatus 300 sends the image data to the main image forming apparatus 200 (operation S2606). Although the image data is destined for the sub image forming apparatus 100, the main image forming apparatus 200 has the IP address of the sub image forming apparatus 100 in the network and accordingly the image data can be sent to the main image forming apparatus 200. While the host apparatus 300 sends only the image data to the main image forming apparatus 200 according to the image forming job request, the host apparatus 300 can generate and send the job command to the main image forming apparatus 200 and send the image data when the response signal is received from the main image forming apparatus 200.

Upon receiving the image data from the host apparatus 200, the main image forming apparatus 200 stores the received image data (operation S2607). While the single image forming job is requested from the host apparatus 300 in the exemplary embodiment illustrated in FIG. 26, operations S2605 through S2607 can be repeated when a plurality of image forming jobs is requested. Furthermore, the host apparatus 300 is not necessarily the same physical device, and the image forming job can be requested by various host apparatuses 300 such as a fax machine, a smart phone, and a computer.

When the normal mode entrance command is input to the sub image forming apparatus 100 (operation S2608), the sub image forming apparatus 100 enters the normal mode (operation S2609). For example, when the plug to supply power to the sub image forming apparatus 100 is inserted to the socket or the sub image forming apparatus 100 is turned on, the sub image forming apparatus 100 can enter the normal mode. Next, the sub image forming apparatus 100 requests the image data from the main image forming apparatus (operation S2610). The main image forming apparatus 200 receiving the image data request sends the stored image data to the sub image forming apparatus 100 (operation S2611). The sub image forming apparatus 100 performs the image forming job using the received image data (operation S2612).

Figure 27:
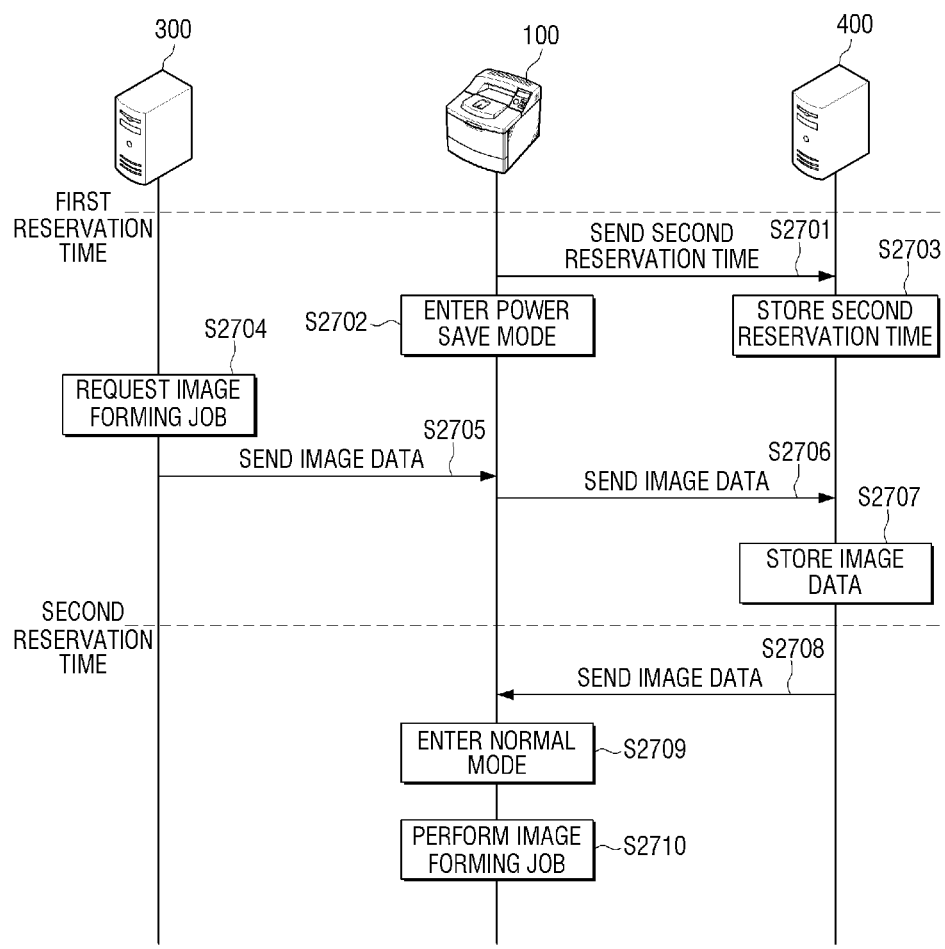

FIG. 27 is a sequence diagram illustrating the job execution method according to a further exemplary embodiment of the present general inventive concept. Particularly, in FIG. 27, the main image forming apparatus 200 of FIG. 1 is implemented using a server 400.

At the first reservation time, the sub image forming apparatus 100 sends information on the second reservation time to switch from the power save mode to the normal mode to the server 400 (operation S2701) and enters the power save mode (operation S2702). The server 400, receiving the second reservation time information from the sub image forming apparatus 100, stores the received second reservation time information (operation S2703).

Herein, to send the second reservation time information to the server 400, the sub image forming apparatus 100 should know the IP address or the MAC address of the server 400 in advance. The IP address or the MAC address of the server 400 can be transmitted to and stored in every sub image forming apparatus 100 in the network, or the user can directly input the IP address or the MAC address of the server 400 to the sub image forming apparatus 100.

If the server 400 already knows the second reservation time of the sub image forming apparatus 100, for example, when the second reservation time of the sub image forming apparatus 100 is set through the server 400, operations S2701 and S2703 can be omitted.

Next, when the image forming job is requested to the host apparatus 300 (operation S2704), the host apparatus 300 sends the image data to the sub image forming apparatus 100 (operation S2705). Herein, the image forming job request can be the image forming job command such as a printing command or a fax printing command. The host apparatus 300 can generate the image data according to the image forming job request and send the image data to the sub image forming apparatus 100. While in the exemplary embodiment illustrated in FIG. 27 the host apparatus 300 sends only the image data to the sub image forming apparatus 100 according to the image forming job request, the host apparatus 300 can generate and send the job command to the sub image forming apparatus 100 and send the image data when the response signal is received from the sub image forming apparatus 100.

The sub image forming apparatus 100 sends the received image data to the server 400 (operation S2706). Upon receiving the image data from the sub image forming apparatus 100, the server 400 stores the received image data (operation S2707). While the single image forming job is requested from the host apparatus 300 in the exemplary embodiment illustrated in in FIG. 27, operations S2704 through S2707 can be repeated when multiple image forming jobs are requested. Furthermore, the host apparatus 300 is not the physically same device, and the image forming job can be requested by various host apparatuses 300 such as a fax machine, a smart phone, and a computer.

Next, when the second reservation time arrives, the server 400 sends the stored image data to the sub image forming apparatus 100 (operation S2708). The sub image forming apparatus 100 receiving the image data enters the normal mode (operation S2709) and then performs the image forming job using the received image data (operation S2710).

Meanwhile, the server 400 can check the status of the sub image forming apparatus 100 over the network. In detail, the server 400 can check the current status (for example, the power save mode or the normal mode, and error) of the sub image forming apparatus 100 by sending a status check request signal to the sub image forming apparatus 100, and then receiving a status from the sub image forming apparatus 100. The server 400 may then store the status received from the sub image forming apparatus 100.

While the single sub image forming apparatus 100 in the network is described with reference to in the exemplary embodiments illustrated in FIGS. 15 through 27 to ease the understanding of these exemplary embodiments, the present general inventive concept can be applied to a plurality of sub image forming apparatuses in the network, which is explained in detail by referring to FIG. 28.

Figure 28:
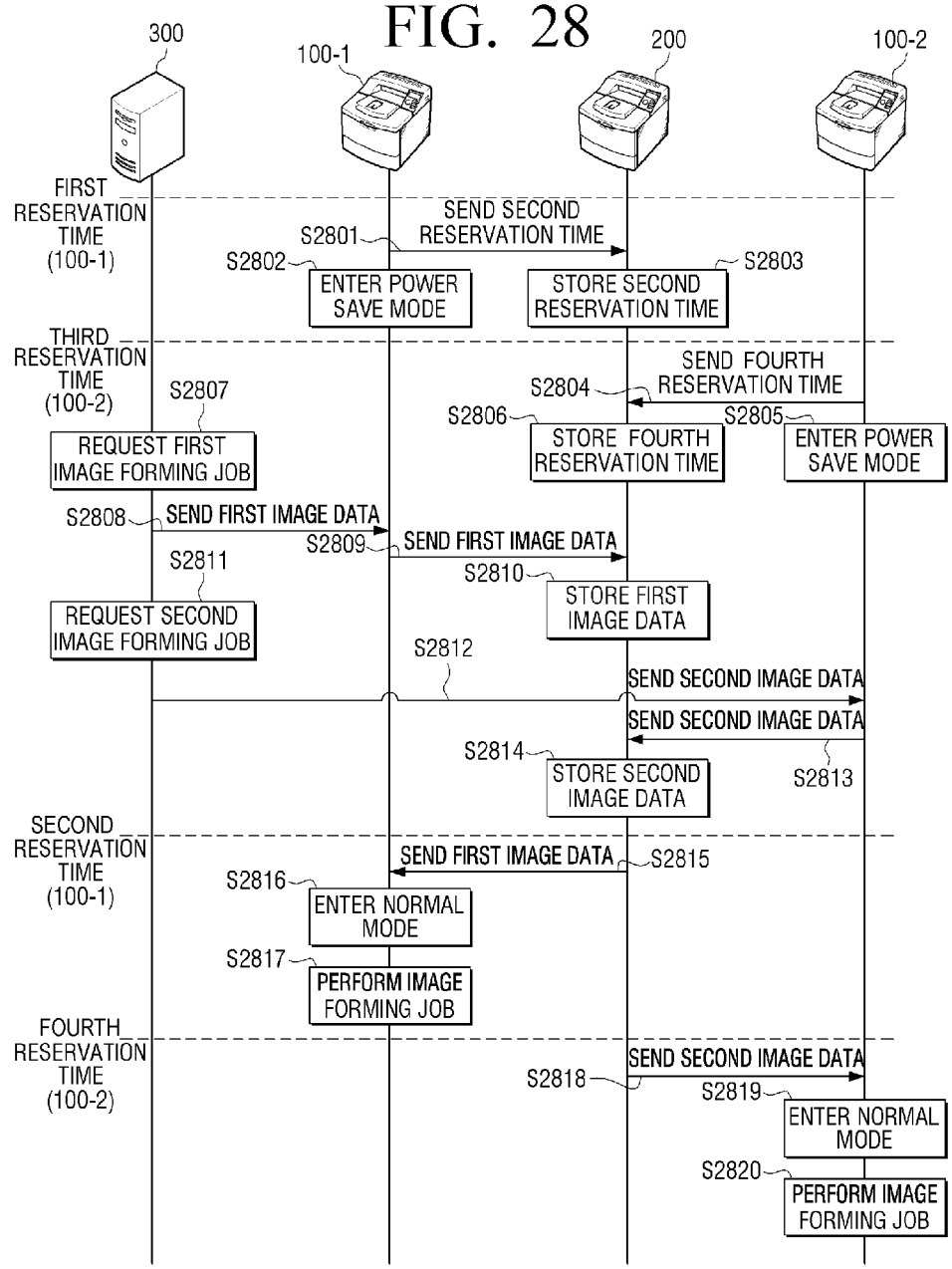

FIG. 28 is a sequence diagram illustrating the job execution method according to a further exemplary embodiment of the present general inventive concept. Particularly, as illustrated in FIG. 28, multiple sub image forming apparatuses 100-1 and 100-2 are present in the network. Each sub image forming apparatus 100 may have respective first and second reservation times. For the purposes of this exemplary embodiment of the present general inventive concept, the first sub image forming apparatus 100-1 has a first reservation time to switch to the power save mode, and a second reservation time to switch from the power save mode to the normal mode. The second sub image forming apparatus 100-2 has a third reservation time to switch to a power save mode, and a fourth reservation time to switch from the power save mode to the normal mode.

When the first reservation time arrives, the first sub image forming apparatus 100-1 sends information on the second reservation time to the main image forming apparatus 200 (operation S2801) and enters the power save mode (operation S2802).

The main image forming apparatus 200, receiving the second reservation time information from the first sub image forming apparatus 100-1, stores the received second reservation time information (operation S2803).

When the third reservation time arrives, the second sub image forming apparatus 100-2 sends information on the fourth reservation time to the main image forming apparatus 200 (operation S2804) and enters the power save mode (operation S2805).

The main image forming apparatus 200, receiving the fourth reservation time information from the second sub image forming apparatus 100-2, stores the received fourth reservation time information (operation S2806).

Next, when the image forming job of the first image forming apparatus 100-1 is requested to the host apparatus 300 (operation S2807), the host apparatus 300 sends first image data to the first sub image forming apparatus 100-1 (operation S2808).

The first sub image forming apparatus 100-1 sends the received first image data to the main image forming apparatus 200 (operation S2809). Upon receiving the first image data from the first sub image forming apparatus 100-1, the main image forming apparatus 200 stores the received image data (operation S2810).

When the image forming job of the second image forming apparatus 100-2 is requested to the host apparatus 300 (operation S2811), the host apparatus 300 sends second image data to the second sub image forming apparatus 100-2 (operation S2812).

The second sub image forming apparatus 100-2 sends the received second image data to the main image forming apparatus 200 (operation S2813). Upon receiving the second image data from the second sub image forming apparatus 100-2, the main image forming apparatus 200 stores the received image data (operation S2814).

Herein, the image forming job request can be the image forming job command such as a printing command or a fax printing command. The host apparatus 300 can generate the image data according to the image forming job request and send the image data to the sub image forming apparatuses 100-1 and 100-2. While in the exemplary embodiment illustrated in FIG. 28 the host apparatus 300 sends only the image data to the sub image forming apparatuses 100-1 and 100-2 according to the image forming job request, the host apparatus 300 can generate and send the job command to the sub image forming apparatuses 100-1 and 100-2, and send the image data when the response signal is received from the sub image forming apparatus 100-1 and 100-2.

While the single image forming job is requested to each sub image forming apparatus in the exemplary embodiment illustrated in FIG. 28, operations S2807 through S2814 can be repeated when multiple image forming jobs are requested. Furthermore, the host apparatus 300 is not necessarily the same physical device, and the image forming job can be requested by various host apparatuses 300 such as a fax machine, a smart phone, and a computer.

Next, when the second reservation time of the first sub image forming apparatus 100-1 arrives, the main image forming apparatus 200 sends the stored first image data to the first sub image forming apparatus 100-1 (operation S2815). The first sub image forming apparatus 100-1 receiving the first image data enters the normal mode (operation S2816) and then performs the image forming job using the received image data (operation S2817).

When the fourth reservation time of the second sub image forming apparatus 100-2 arrives, the main image forming apparatus 200 sends the stored second image data to the second sub image forming apparatus 100-2 (operation S2818). The second sub image forming apparatus 100-2 receiving the second image data enters the normal mode (operation S2819) and then performs the image forming job using the received image data (operation S2820).

Figure 29:
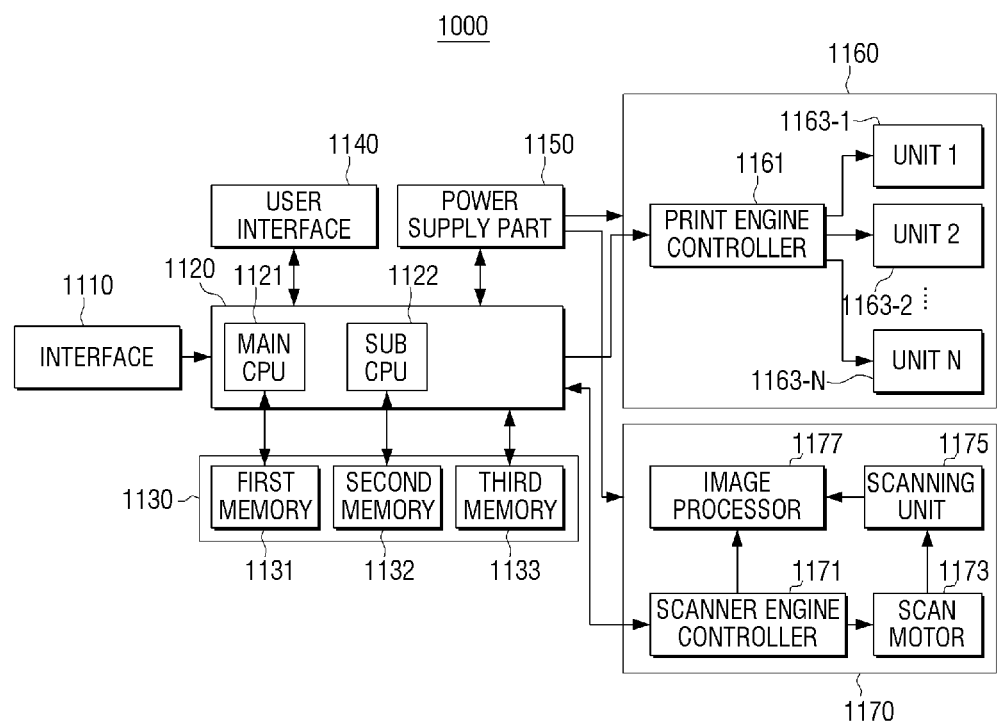
FIG. 29 is a block diagram an image forming apparatus (which may be the main image forming apparatus or the sub image forming apparatus) including various components according to an exemplary embodiment of the present general inventive concept.

FIG. 29 is a block diagram an image forming apparatus 1000 (which may be the main image forming apparatus 200 or the sub image forming apparatus 100) including various components according to another exemplary embodiment of the present general inventive concept.

As illustrated in FIG. 29, the image forming apparatus 1000 includes an interface 1110, a controller 1120, a memory 1130, a user interface 1140, a power supply part 1150, a printing part 1160, and a scanning part 1170. The structure illustrated in FIG. 29 is based on a multi-function peripheral to process at least two of a print function, a scan function, a copy function, and a fax function. In a simple printer for example, some components including the scanning part 1170 can be omitted. The image forming apparatus 1000 may further include a bus (not illustrated) to exchange data between the components and a buffer (not illustrated) to temporarily store the data.

The interface 1110 is connected to the external host apparatus 300 or other image forming apparatus over the network or using a local interface to send and receive image data. That is, the interface 1110 can be connected to a local interface (not illustrated) with the host apparatus 300, or connected to a plurality of external image forming apparatuses (corresponding to the main image forming apparatus 200 or sub image forming apparatus 100) over the wired or wireless network. A wireless communication standard can employ Institute of Electrical and Electronics Engineers (IEEE) 802.11 standard of the United States, hyper LAN standard of Europe, and MMAC-PC standard of Japan.

The user interface 1140 receives various selection commands from the user. The user interface 1140 can include a display panel and at least one button. In this case, the display panel can be implemented using a touch screen (not illustrated). The user interface 1140 provides various UI screens so that the user can input the selection command by directly touching the UI screen or pressing the button of the user interface 1140. The selection command can instruct the image forming apparatus 1000 to perform the image forming job, to set various functions of the image forming apparatus 1000, to select the mode change, or the abortion or resumption of the printing job.

The power supply part 1150 supplies power to the components of the image forming apparatus 1000. For example, the power supply part 1150 can receive the command alternating current AC_IN from the outside, convert the alternating current to direct current of a potential level suitable for the components using elements such as transformer, inverter, and rectifier, and thus output DC_OUT.

The printing part 1160 can include a print engine controller 1161 and a plurality of units 1163-1 through 1163-n to process the printing job. In a laser printer, the units 1163-1 through 1163-n can include for example a feeding part, a charging part, an exposing part, a developing part, a transfer part, a fixing part, and a discharging part. In an inkjet printer, the units 1163-1 through 1163-n can include for example a feeding part, an inkjet print head, an ink cartridge, and a discharging part. The print engine controller 1161 controls the units 1163-1 through 1163-n to print a bitmap image as provided from the controller 1120.

Meanwhile, when a scan command is input through the user interface 1140, the controller 1120 can control the scanning part 1170 to perform the scan job.

The scanning part 1170 can include a scanner engine controller 1171, a scanning motor 1173, a scanning unit 1175, and an image processor 1177.

The scanner engine controller 1171 communicates with the controller 1120 and thus controls the components of the scanning part 1170 to perform the scan job. In detail, when a scan command is fed from the controller 1120, the scanner engine controller 1171 scans an object by driving the scanning unit 1175 and the scan motor 1173 and controls the image processor 1177 to generate the scan data.

The scan motor 1173 moves the scanning unit 1175 or a paper so as to scan the object. That is, the medium moved by the scan motor 1173 differs according to whether the scanner is a sheet feed type or a flatbed type. For example, the scan motor 1173 of the sheet feed scanner moves the paper and the scan motor 1173 of the flatbed scanner moves the scanning unit 1175. The scan motor 1173 can be implemented using a carriage return motor.

The scanning unit 1175 scans the object. The scanning unit 1175 can include an image reading sensor, a lens, a light source, and so on. The image reading sensor mostly uses a CCD or CIS image sensor. The image reading sensor can include a photoelectric converter to absorb the reflected light which is produced from the light source and projected to the object and generating electric charge, and a signal detector (not illustrated) to detect and converting the electric charge generated by the photoelectric converter, to an electric signal. The electric signal converted by the signal detector is provided to the image processor 1177.

The image processor 1177 processes shading and gamma correction, Dot Per Inch (DPI) conversion, edge emphasis, error diffusion, and scaling of the image data input from the scanning unit 1175, and thus generates the scanning data. In this case, the image data is suitably processed by considering a predefined resolution, a scan mode, a scan region, and a zoom ratio.

The controller 1120 controls the operations of the image forming apparatus according to the data and the command of the external device connected through the interface 1110, or the user selection command input through the user interface 1140.

In detail, when a printer driver or an application installed in the host apparatus 300 executes the print command, the printer driver of the host apparatus 300 generates the image data by converting the corresponding document into a certain printer language. The controller 1120 receives such image data through the interface 1110. The controller 1120 converts the image data to the bitmap image including zeroes and ones using a halftone table (not illustrated) and provides the bitmap image to the printing part 1160 to print it onto the paper (not illustrated).

Particularly, the controller 1120 includes a main CPU 1121 operating in the normal mode and a sub CPU 1122 operating in the power save mode. In more detail, when the image forming apparatus 1000 operates in the normal mode, the main CPU 1121 is activated to perform the image forming job using the image data received from the host apparatus 300. By contrast, when the image forming apparatus 1000 operates in the power save mode, the main CPU 1121 is deactivated and the sub CPU 1122 is activated to control the image forming apparatus 1000 using a second memory 1132.

The memory 1130 stores various information such as specifications, service condition, printing data, scan data, data processed, print history information of the image forming apparatus 1000, various application programs and an Operating System (O/S) used in the image forming apparatus 1000.

In particular, the memory 1130 can include a first memory 1131 used in the normal mode, the second memory 1132 used in the power save mode, and a third memory 1133. The first memory 1131, which is the main memory used in the normal mode, can be implemented using a Dynamic RAM (DRAM) and store a program and an application for the network communication in the normal mode. The second memory 1132 can be used in the power save mode which consumes the lower power than the normal mode. For example, the second memory 1132 stores a program and an application to support the power save mode, and can be implemented using one of a Static RAM (SRAM) and a Synchronous Dynamic RAM (SDRAM). Besides, the second memory 1132 can use for example a RAMBus, a DRAM, and a Double Data Rate Synchronous Dynamic Random Access Memory (DDR-SDRAM). The third memory 1133 can be used to store necessary codes in the normal mode, and other various data. The third memory 1133 can be implemented using at least one of a Read Only Memory (ROM) and a flash memory.

While the single first memory 1131, the single second memory 1132, and the single third memory 1133 are illustrated in FIG. 29, their number and size can be variously designed in accordance with characteristics of the image forming apparatus 1000.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a Blu-Ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus comprising:
   a memory;
   an interface to receive image data to perform an image forming job; and
   a controller to send time information on a second reservation time to switch the image forming apparatus from a power save mode to a normal mode to an external image forming apparatus, and when the image data is input in the power save mode of the image forming apparatus, send the image data to the external image forming apparatus, and when the image forming apparatus switches to the normal mode, control the image forming apparatus to perform an image forming job using the image data received from the external image forming apparatus based on the sent time information,
   wherein the second reservation time is input by a user separately from any image forming job.

2. The image forming apparatus of claim 1, wherein:
   the controller controls the image forming apparatus to switch to the normal mode when the image data is received from the external image forming apparatus, when a user command to enter the normal mode is input, or when a preset time related to the time information arrives.

3. The image forming apparatus of claim 1, wherein:
   the memory stores a first reservation time to switch the image forming apparatus from the normal mode to the power save mode and the second reservation time;
   when the first reservation time arrives in the normal mode of the image forming apparatus, the controller controls the image forming apparatus to send time information on the second reservation time to the external image forming apparatus and then enter the power save mode; and
   when the second reservation time arrives in the power save mode of the image forming apparatus and the image data is received from the external image forming apparatus, the controller controls the image forming apparatus to enter the normal mode and perform the image forming job.

4. The image forming apparatus of claim 1, wherein:
   the controller controls the image forming apparatus to enter the normal mode when a user command to enter the normal mode is input in the power save mode of the image forming apparatus; and
   when image data is requested to the external image forming apparatus and the image data is received from the external image forming apparatus, the controller controls the image forming apparatus to perform an image forming job using the image data.

5. The image forming apparatus of claim 1, wherein:
   the memory stores a first reservation time to switch the image forming apparatus from the normal mode to the power save mode and a second reservation time to switch the image forming apparatus from the power save mode to the normal mode;
   when the second reservation time arrives in the power save mode of the image forming apparatus, the controller controls the image forming apparatus to automatically enter the normal mode; and
   when image data is requested to the external image forming apparatus and the image data is received from the external image forming apparatus, the controller controls the image forming apparatus to perform an image forming job using the image data.

6. The image forming apparatus of claim 1, wherein:
   the memory comprises:
     a first memory; and
     a second memory; and
   the controller comprises:
     a main Central Processing Unit (CPU) operating in the normal mode using the first memory; and
     a sub CPU operating in the power save mode using the second memory.

7. An image forming apparatus comprising:
   an interface to receive from an external image forming apparatus image data to be printed by the external image forming apparatus and time information about a time to switch the external image forming apparatus from a power save mode to a normal mode;
   a memory to store the received image data; and
   a controller to, when a preset time related to the time information arrives send the stored image data to the external image forming apparatus,
   wherein the time to switch the external image forming apparatus is input by a user separately from any image forming job.

8. The image forming apparatus of claim 7, wherein the controller receives from the external image forming apparatus the time information about the time to switch the external image forming apparatus from a power save mode to a normal mode, stores the time information in the memory, and sends the stored image data to the external image forming apparatus when the time to switch the external image forming apparatus from the power save mode to the normal mode arrives.

9. The image forming apparatus of claim 7, wherein the memory comprises:
   a first memory to operate in a normal mode;
   a second memory to operate in a power save mode; and
   a flash memory to back up the second memory in the power save mode,
   wherein, when the second memory lacks a space to store the image data in the power save mode, the controller stores the image data in the flash memory.

10. The image forming apparatus of claim 7, wherein the memory comprises:
    a first memory to operate in a normal mode; and
    a second memory to operate in a power save mode, wherein the controller compresses the image data to reduce a size of the image data in the power save mode and stores the compressed data in the second memory.

11. A method of performing a job of an image forming apparatus, comprising:
sending time information on a second reservation time to switch the image forming apparatus from a power save mode to a normal mode to an external image forming apparatus;
entering, at the image forming apparatus, the power save mode;
when image data is input to the image forming apparatus while the image forming apparatus is in the power save mode, sending the image data to the external image forming apparatus;
entering, at the image forming apparatus, the normal mode; and
performing, at the image forming apparatus, an image forming job using the image data received from the external image forming apparatus based on the sent time information,
wherein the second reservation time is input by a user separately from any image forming job.

12. The method of claim 11, wherein the normal mode is entered when the image data is received from the external image forming apparatus, a user command to enter the normal mode is input, or a preset time related to the time information arrives.

13. The method of claim 11, wherein:
when the image data is received from the external image forming apparatus while the image forming apparatus is in the power save mode, the image forming apparatus enters the normal mode.

14. The method of claim 11, wherein:
when a user command to enter the normal mode is input while the image forming apparatus is in the power save mode, the image forming apparatus enters the normal mode, and
when image data is requested to the external image forming apparatus and the image data is received from the external image forming apparatus, the image forming apparatus performs an image forming job using the image data.

15. The method of claim 11, wherein:
when a time to switch from the power save mode to the normal mode arrives while the image forming apparatus is in the power save mode, the image forming apparatus automatically enters the normal mode, and
when image data is requested to the external image forming apparatus and the image data is received from the external image forming apparatus, the image forming apparatus performs an image forming job using the image data.

16. The method of claim 11, wherein:
entering the power save mode comprises:
determining whether there is a remaining image forming job;
when detecting the remaining image forming job, perform the image forming job; and
when the remaining image forming job is performed, entering the power save mode.

17. A method of performing a job of an image forming apparatus, comprising:
receiving from the external image forming apparatus time information about a time to switch an external image forming apparatus from a power save mode to a normal mode;
receiving from the external image forming apparatus image data to be printed by the external image forming apparatus;
storing the received image data in a memory; and
when a preset time related to the time information arrives, sending the stored image data to the external image forming apparatus,
wherein the time to switch the external image forming apparatus is input by a user separately from any image forming lob.

18. The method of claim 17, further comprising:
storing the received time information in the memory,
wherein the stored image data is sent to the external image forming apparatus when the time to switch the external image forming apparatus from the power save mode to the normal mode arrives.

19. The method of claim 17, wherein the memory comprises:
a first memory to operate in a normal mode;
a second memory to operate in a power save mode; and
a flash memory to back up the second memory in the power save mode,
wherein storing the received image data in the memory comprises:
storing the image data in the flash memory when the second memory lacks a space to store the image data in the power save mode.

20. The method of claim 17, wherein the memory comprises:
a first memory to operate in a normal mode; and
a second memory to operate in a power save mode,
wherein storing the received image data in the memory comprises:
compressing the image data to reduce a size of the image data in the power save mode; and
storing the compressed data in the second memory.

* * * * *

UNITED STATES PATENT AND TRADEMARK OFFICE
CERTIFICATE OF CORRECTION

| | | |
|---|---|---|
| PATENT NO. | : 9,179,028 B2 | Page 1 of 1 |
| APPLICATION NO. | : 13/960020 | |
| DATED | : November 3, 2015 | |
| INVENTOR(S) | : Man-suk Park et al. | |

It is certified that error appears in the above-identified patent and that said Letters Patent is hereby corrected as shown below:

IN THE CLAIMS

Claim 17, Column 40, Line 25

Delete "lob." and insert --job.--, therefor.

Signed and Sealed this
Second Day of February, 2016

Michelle K. Lee
*Director of the United States Patent and Trademark Office*